US012208366B2

(12) United States Patent
O'Hare et al.

(10) Patent No.: US 12,208,366 B2

(45) Date of Patent: Jan. 28, 2025

(54) USES OF MAGNESIUM PHOSPHATE CONTAINING MINERALS

(71) Applicant: Oxford University Innovation Limited, Oxford (GB)

(72) Inventors: Dermot O'Hare, Oxford (GB); Hongri Suo, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 589 days.

(21) Appl. No.: 17/607,966

(22) PCT Filed: May 4, 2020

(86) PCT No.: PCT/GB2020/051095

§ 371 (c)(1),
(2) Date: Nov. 1, 2021

(87) PCT Pub. No.: WO2020/222022

PCT Pub. Date: Nov. 5, 2020

(65) Prior Publication Data

US 2022/0288555 A1 Sep. 15, 2022

(30) Foreign Application Priority Data

May 2, 2019 (EP) .................................... 19172406

(51) Int. Cl.

| | |
|---|---|
| ***B01J 20/04*** | (2006.01) |
| ***B01J 20/06*** | (2006.01) |
| ***B01J 20/08*** | (2006.01) |
| ***B01J 20/28*** | (2006.01) |
| ***B01J 20/30*** | (2006.01) |
| ***C01B 25/45*** | (2006.01) |
| ***C01F 7/784*** | (2022.01) |
| ***C01F 7/785*** | (2022.01) |

(52) U.S. Cl.

CPC ........... *B01J 20/041* (2013.01); *B01J 20/043* (2013.01); *B01J 20/06* (2013.01); *B01J 20/08* (2013.01); *B01J 20/28011* (2013.01); *B01J 20/28057* (2013.01); *B01J 20/3085* (2013.01); *C01B 25/45* (2013.01); *C01F 7/784* (2022.01); *C01F 7/785* (2022.01)

(58) Field of Classification Search

CPC ........ B01J 20/041; B01J 20/043; B01J 20/06; B01J 20/08; B01J 20/28011; B01J 20/28057; B01J 20/3085; C01F 7/784; C01F 7/785; C01B 25/45

USPC .......................................................... 502/340

See application file for complete search history.

(56) References Cited

U.S. PATENT DOCUMENTS

| | | | | |
|---|---|---|---|---|
| 4,883,533 | A * | 11/1989 | Kosin | C08K 3/32 524/417 |
| 5,075,087 | A * | 12/1991 | Kosin | C01B 25/45 524/417 |
| 5,364,828 | A | 11/1994 | Cox et al. | |
| 2012/0228229 | A1* | 9/2012 | Douglas | B01J 20/08 210/685 |
| 2018/0354809 | A1 | 12/2018 | O'Hare et al. | |

FOREIGN PATENT DOCUMENTS

| | | | | |
|---|---|---|---|---|
| CN | 114368734 | A * | 4/2022 | C01B 25/451 |
| WO | 2009039133 | A1 | 3/2009 | |

OTHER PUBLICATIONS

D.M. Anderson, P.M. Glibert and J. M. Burkholder Harmful Algal Blooms and Eutrophication: Nutrient Sources, Composition, and Consequences Journal Aug. 2002 704-726 vol. 25 Estuaries.

E. Romero, J. Garnier, L. Lassaletta, G. Billen, R. Le Gendre, P. Riou and P. Cugier Large-scale patterns of river inputs in southwestern Europe: seasonal and interannual variations and potential eutrophication effects at the coastal zone Journal Aug. 2012 481-505 vol. 113 Biogeochemistry.

V. H. Smith Eutrophication of Freshwater and Coastal Marine Ecosystems Journal Mar. 2003 126-139 vol. 10 Environmental Science and Pollution Research.

H. A. B. Tajarudin, M. F. B. Othman, N. A. B. Serri and M. R. B. Tamat Control and Treatment of Landfill Leachate for Sanitary Waste Disposal Book 2016 219-249 vol. 10 IGI Global.

M. Ulbricht, J. Schneider, M. Stasiak and A. Sengupta Ammonia Recovery from Industrial Wastewater by TransMembraneChemiSorption Journal Jun. 21, 2013 1259-1262 vol. 85 Chemie Ingenieur Technik.

B. Beler-Baykal, A. Allar and S. Bayram Nitrogen recovery from source-separated human urine using clinoptilolite and preliminary results of its use as fertilizer Journal Feb. 1, 2011 811-817 vol. 63 Water Science and Technology.

J. C. Buffet, C. F. Byles, R. Felton, C. Chen and D. O'Hare Metallocene supported core@LDH catalysts for slurry phase ethylene polymerisation Journal Feb. 22, 2016 4076-4079 vol. 52 Chem. Commun.

Q. Wang, X. Zhang, J. Zhu, Z. Guo and D. O'Hare Preparation of stable dispersions of layered double hydroxides (LDHs) in nonpolar hydrocarbons: new routes to polyolefin/LDH nanocomposites Journal Aug. 1, 2012 7450-7452 vol. 48 Chemical commun.

Q. Wang, J. P. Undrell, Y. Gao, G. Cai, J.-C. Buffet, C. A. Wilkie and D. O'Hare Synthesis of Flame-Retardant Polypropylene/LDH-Borate Nanocomposites Journal Jul. 15, 2013 6145-6150 vol. 46 Macromolecules.

W. Al Maksoud, C. Larabi, A. Garron, K. C. Szeto, J. J. Walter and C. C. Santini Direct thermocatalytic transformation of pine wood into low oxygenated biofuel Journal Feb. 24, 2014 3031-3038 vol. 16 Green Chemistry.

(Continued)

*Primary Examiner* — Patricia L. Hailey

(74) *Attorney, Agent, or Firm* — Thomasl Horstemeyer, LLP

(57) ABSTRACT

Processes for making magnesium-containing layered double hydroxides from a magnesium phosphate-containing mineral are disclosed, as well as a magnesium-containing layered double hydroxides and their uses.

20 Claims, 34 Drawing Sheets

(56) References Cited

OTHER PUBLICATIONS

S. Itagaki, N. Matshuhashi, K. Taniguchi, K. Yamaguchi and N. Mizuno Efficient Hydrodeoxygenation of Ketones, Phenols, and Ethers Promoted by PlatinumHeteropolyacid Bifunctional Catalysts Journal Apr. 18, 2014 1086-1088 vol. 43 Chemistry Letters.
M. F. Chislock, E. Doster, R. A. Zitomer and A. Wilson Eutrophication: Causes, Consequences and Controls in Aquatic Ecosystems Journal Jan. 2013 vol. 10 1-8 Nature Education Knowledge.
S. Kataki, H. West, M. Clarke and D. C. Baruah Phosphorus recovery as struvite: Recent concerns for Use of seed, Alternative Mg source, Nitrogen conservation and Fertilizer potential Manuscript Jan. 12, 2016 vol. 107 1-48 Resources, Conservation and Recycling.
M. Darwish, A. Aris, M. H. Puteh, M. Z. Abideen and M. N. Othman Ammonium-Nitrogen Recovery from Wastewater by Struvite Crystallization Technology Journal Nov. 17, 2015 vol. 45 261-274 Separation & Purification Reviews.
Systemic Struvite Product Factsheet—1-3 https://systemicproject.eu/).
C. K. Chauhan and M. J. Joshi, J. In vitro crystallization, characterization and growth-inhibition study of urinary type struvite crystals Journal Nov. 19, 2011 vol. 362 330-337 Cryst. Growth.
H. Huang, D. Xiao, J. Liu, L. Hou and L. Ding Recovery and removal of nutrients from swine wastewater by using a novel integrated reactor for struvite decomposition and recycling Journal May 11, 2015 5:1083 1-13 Sci. Rep.
International Search Report and Written Opinion for WO 2020/201749 (PCT/GB2020/051095), dated Jul. 23, 2020, pp. 1-15.
Extended Europen Search Report for EP 19172406.1, dated Nov. 6, 2019, pp. 1-13.
Zhong-Zhu Yang et al: "A review on strategies to LOH-based materials to improve adsorption capacity and photoreduction efficiency for C02", Coordination Chemistry Reviews, vol. 386, May 1, 2019 (May 1, 2019), pp. 154-182.
S. Radha et al: "Energetics of CO2 Adsorption on Mg—Al Layered Double Hydroxides and Related Mixed Metal Oxides", Journal of Physical Chemistry C, vol. 118, No. 51, Dec. 3, 2014 (Dec. 3, 2014), pp. 29836-29844.
Zhu Xuancan et al: "Synthesis of elevated temperature CO2 adsorbents from aqueous miscible organic-layered double hydroxides", Energy, vol. 167, Nov. 7, 2018 (Nov. 7, 2018), pp. 960-969.
Zhao Y et al: "Preparation of Layered Double-Hydroxide Nanomaterials With a Uniform Crystallite Size Using a New Method Involving Separate Nucleation and Aging Steps", Chemistry of Materials, American Chemical Society, vol. 14, No. 10, Oct. 1, 2002 (Oct. 1, 2002), pp. 4286-4291.

* cited by examiner

USES OF MAGNESIUM PHOSPHATE CONTAINING MINERALS

CROSS-REFERENCE TO RELATED APPLICATIONS

This application is the National Stage of International Application No. PCT/GB2020/051095, filed May 4, 2020, which claims priority to EP 19172406.1, filed May 2, 2019, which are entirely incorporated herein by reference.

INTRODUCTION

The present invention relates to a process for the preparation of a magnesium-containing layered double hydroxide from a magnesium phosphate-containing mineral, a magnesium-containing layered double hydroxide obtainable by such as process and the use of such a magnesium-containing layered double hydroxide.

BACKGROUND OF THE INVENTION

Struvite is a magnesium phosphate-containing mineral having the formula $(NH_4)Mg(PO_4).6H_2O$. As well as occurring naturally as a product of organic decay of putrescent matter, unwanted struvite formation can also occur spontaneously in waste water treatment plants (WWTP) after anaerobic digestion releases ammonium and phosphate from waste material. Struvite deposition in WWTP lines, pumps, pipes and other equipment can cause notably reduced WWTP efficiency, thus necessitating its removal, which can be costly.

Nevertheless, the struvite precipitation process is recognised as a useful tool to the water treatment industry (K. S. Le Corre et al., *Critical Reviews Environmental Science & Technology* (2009), 39, 433-477; A. Siciliano & S. D. Rosa, *Environmental Technology* (2014), 35, 841-850) due to the fact that it can effectively remove magnesium, ammonium and phosphate from water, excesses of which can lead to environmental problems, such as water eutrophication. As a consequence, the ever-increasing need for clean water inevitably results in the generation of extremely large quantities of struvite, often extending into the millions of tons each year.

Struvite has found some commercial use as a slow-release fertiliser [M. Latifian et al., *Environmental Technology* (2012), 33, 2691-2697; M. Latifian et al., *Environmental Technology* (2014), 35, 2289-2295]. However, the market for such materials is limited due to concerns that organic fertilisers— in particular those derived from WWTP— may engender an increased risk of antibiotic resistance amongst humans and livestock (Q. Chen et al., *Environmental Science & Technology* (2017), 51, 8149-8157; H. D. Ryu et al., *J. Hazard. Mater*. (2012), 221-222, 248-255).

Due to the large amounts of struvite produced annually worldwide as a waste product, there remains a need to find new uses for this material. The present invention was devised with the foregoing in mind.

SUMMARY OF THE INVENTION

According to a first aspect of the present invention there is provided a process for preparing a magnesium-containing layered double hydroxide comprising the step of:

(a) using a magnesium phosphate-containing mineral as a source of $Mg^{2+}$ ions in a process of preparing a layered double hydroxide.

According to a second aspect of the present invention there is provided a magnesium-containing layered double hydroxide obtainable, obtained or directly obtained by a process defined herein.

According to a third aspect of the present invention there is provided a magnesium-containing-layered double hydroxide having a specific surface area of ≥80 $m^2$ $g^{-1}$ and a tap density of at least 0.25 g $cm^{-3}$.

According to a fourth aspect of the present invention there is provided the use of a magnesium-containing layered double hydroxide as defined herein as a sorbent, a catalytic support or a filler in a composite material.

According to a fifth aspect of the present invention, there is provided a thermally-treated (e.g. calcined) magnesium-containing layered double hydroxide according to the second or third aspect.

According to a sixth aspect of the present invention, there is provided a layered double oxide obtained, obtainable or directly obtained by thermally-treating (e.g. calcining) a magnesium-containing layered double hydroxide according to the second or third aspect.

According to a seventh aspect of the present invention, there is provided a use of a thermally-treated (e.g. calcined) magnesium-containing layered double hydroxide according to the fifth aspect, or a layered double oxide according to the sixth aspect, as a sorbent. Suitably, the sorbent is used to adsorb $CO_2$.

Throughout this specification, it will be appreciated that suitable, preferred and optional features of any particular aspect of the invention are also suitable, preferred and optional features of any other aspect of the invention.

DETAILED DESCRIPTION OF THE INVENTION

Processes for Preparing Magnesium-Containing LDHs

In a first aspect, the present invention provides a process for the preparation of a magnesium-containing layered double hydroxide, the process comprising the step of:

(a) using a magnesium phosphate-containing mineral as a source of $Mg^{2+}$ ions in a process of preparing a layered double hydroxide.

Layered double hydroxides (LDHs) and their structure will be familiar to one of ordinary skill in the art. LDHs comprise positively-charged layers of mixed metal hydroxides having charge-balancing layers of anions intercalated therebetween. LDHs comprise at least one monovalent or divalent cation in combination with at least one trivalent or tetravalent cation within their positively-charged layers. Therefore, the magnesium-containing LDHs formed according to the processes of the present invention are LDHs that comprise $Mg^{2+}$ divalent cations, as well as trivalent or tetravalent cations, as part of their positively-charged layers. Other monovalent or divalent cations may be present alongside $Mg^{2+}$.

The process of the invention not only provides a means of readily accessing a range of LDHs from an inexpensive starting material, the LDHs themselves have advantageous properties. In particular, the LDHs have surprisingly high density and surface area properties that make them particularly well suited to, for example, catalytic applications. When compared with the use of conventionally used metal precursors such as magnesium chloride, magnesium sulphate, magnesium nitrate and magnesium phosphate itself, the inventors were surprised to learn that magnesium phosphate-containing minerals (such as struvite), which is often considered a waste product, can be used to produce LDHs in good yield, high purity and having unexpectedly interesting physical properties that make them attractive candidates for industry. Moreover, the resulting LDHs can be readily converted into layered double oxides (LDOs) having advantageous properties.

The term ‘magnesium phosphate-containing mineral’ as used herein refers to a naturally-occurring mineral that comprises both magnesium and phosphate ions. In an embodiment, the magnesium phosphate-containing mineral is a magnesium phosphate-containing mineral belonging to the Nickel-Strunz classification group 8.C. In an embodiment, the magnesium phosphate-containing mineral is a magnesium phosphate-containing mineral belonging to the Nickel-Strunz classification group 8.CH. In an embodiment, the magnesium phosphate-containing mineral is a magnesium phosphate-containing mineral belonging to the Nickel-Strunz classification group 8.CH.40.

In a particular embodiment, the magnesium phosphate-containing mineral is struvite, struvite-(K), or a magnesium phosphate-containing mineral derived from struvite. Suitably, the magnesium phosphate-containing mineral is struvite or a magnesium phosphate-containing mineral derived from struvite. More suitably, the magnesium phosphate-containing mineral is struvite.

In a particular embodiment, the magnesium phosphate-containing mineral is $(NH_4)Mg(PO_4).6H_2O$.

A magnesium phosphate-containing mineral derived from struvite comprises minerals that are formed by the thermal decomposition of struvite (optionally in water) such as $Mg_3(PO_4)_2.8H_2O$ (bobierrite).

In an embodiment, the layered double hydroxide preparation process of step a) is a coprecipitation process.

The $Mg^{2+}$ ions may be generated in step a) by contacting the magnesium phosphate-containing mineral (e.g. struvite) with an aqueous solution (e.g. water). Suitably, the temperature of the aqueous solution is 5-120° C.

In an embodiment, the temperature of the aqueous solution is 20-99° C., suitably 30-95° C., more suitably 50-95° C., even more suitably 55-90° C., and most suitably 75-90° C.

The aqueous solution may be pH 7 (e.g. water) or pH>7 (e.g. 1M NaOH).

The magnesium phosphate-containing mineral may be contacted with the aqueous solution for 10-240 minutes. Suitably, the magnesium phosphate-containing mineral is contacted with the aqueous solution for 20-120 minutes, such as 20-90 minutes, 30-75 minutes, or 30-60 minutes.

In an embodiment, the magnesium phosphate-containing mineral is contacted with the aqueous solution for 30-75 minutes at a temperature of 55-90° C. Suitably, the magnesium phosphate-containing mineral is contacted with the aqueous solution for 30 minutes at a temperature of 75° C.

In a particularly suitable embodiment, the magnesium phosphate-containing mineral is struvite or a magnesium phosphate-containing mineral derived from struvite, and the $Mg^{2+}$ ions are generated in step a) by contacting the magnesium phosphate-containing mineral with an aqueous solution for 30-75 minutes at a temperature of 55-90° C., and wherein the layered double hydroxide preparation process of step a) is a coprecipitation process.

In an embodiment, the magnesium phosphate-containing mineral is struvite and the ammonia generated following contacting the struvite with the aqueous solution is removed from the process. The ammonia may be removed by carrying out the process under a flow of an inert gas (e.g. nitrogen). Alternatively, the ammonia may be removed by sparging the aqueous solution with an inert gas (e.g. nitrogen). Preferably, the removal of ammonia is enhanced by trapping the generated ammonia. This may be achieved by bubbling the generated ammonia gas into a trap containing an acidic medium (such as hydrochloric acid, sulfuric acid or nitric acid). Therefore, in an embodiment, the ammonia generated following contacting the struvite with the aqueous solution is removed as an ammonium salt (e.g. ammonium chloride).

Step a) may further comprise mixing the generated $Mg^{2+}$ ions with:

at least one M', wherein M' is a trivalent or tetravalent cation, at least one X, wherein X is an anion, and optionally M, wherein M is a monovalent or divalent cation other than $Mg^{2+}$, in an aqueous reaction medium (e.g. water) at a pH sufficient to form a layered double hydroxide.

In a particular embodiment, step a) further comprises mixing the generated $Mg^{2+}$ ions with:

at least one M', wherein M' is $Al^{3+}$, at least one X, wherein carbonate accounts for >75 wt % (or >85 wt % or 95 wt % or >99 wt %) of all anions X used in step a), and optionally M, wherein M is $Zn^{2+}$, in an aqueous reaction medium (e.g. water) at a pH sufficient to form a layered double hydroxide.

Suitably, when used in relation to M', at least one means only one.

A pH sufficient to form a layered double hydroxide is typically a basic pH. Therefore, in an embodiment, the pH of the aqueous reaction medium is 9.5-13.0. Suitably, the pH of the aqueous reaction medium is 11.0-12.0.

The temperature of the aqueous reaction medium may be 5-90° C. Suitably, the temperature of the aqueous reaction medium is 35-85° C., more suitably 55-75° C.

The mixing in the aqueous reaction medium is carried out for a period of time sufficient to allow the magnesium-containing layered double hydroxide to form; this period is referred to as ‘ageing’ of the mixture. The formed layered double hydroxide may be aged in the aqueous reaction medium for 1-200 hours, such as 2-150 hours, 12-150 hours, 24-100 hours, or 36-72 hours. At higher temperatures, the ageing period can typically be reduced.

In an embodiment, the temperature of the aqueous reaction medium is 25-45° C. and the formed layered double hydroxide is aged in the aqueous reaction medium for 72-200 hours.

In an embodiment, the temperature of the aqueous reaction medium is 45-65° C. and the formed layered double hydroxide is aged in the aqueous reaction medium for 1-100 hours (such as 2-24 hours).

In a particularly suitable embodiment, the temperature of the aqueous reaction medium is 65-85° C. and the formed layered double hydroxide is aged in the aqueous reaction medium for 1-24 hours (such as 2-8 hours).

The formed layered double hydroxide may be isolated from the aqueous reaction medium and then washed with water.

Suitably, the formed layered double hydroxide, once isolated, is not washed with acetone or ethanol. Suitably, the formed layered double hydroxide, once isolated, is not washed with any organic solvents.

M' is a trivalent or tetravalent metal cation. In an embodiment, M' is selected from $Al^{3+}$, $Ga^{3+}$, $Y^{3+}$, $In^{3+}$, $Fe^{3+}$, $Co^{3+}$, $Ni^{3+}$, $Mn^{3+}$, $Cr^{3+}$, $Ti^{3+}$, $V^{3+}$, $La^{3+}$, $Sn^{4+}$, $Ti^{4+}$ and $Zr^{4+}$. Suitably, M' is selected from $Al^{3+}$, $Fe^{3+}$, $Co^{3+}$ and $Ti^{3+}$. More suitably, M' is $Al^{3+}$.

M, when present, is a monovalent or divalent cation other than $Mg^{2+}$. Suitably, M, when present, is selected from $Ca^{2+}$ and $Zn^{2+}$.

In a particularly suitable embodiment, M is absent, such that $Mg^{2+}$ is the only monovalent or divalent cation.

In an embodiment, the layered double hydroxide is a MgAl layered double hydroxide or a MgZnAl layered double hydroxide. In such an embodiment, M' is $Al^{3+}$ and M is either absent or is $Zn^{2+}$.

In a particularly suitable embodiment, the layered double hydroxide is a $Mg_{1-x}Al_x$ layered double hydroxide or a $(Mg_uZn_w)_{1-x}Al_x$ layered double hydroxide, wherein u+w=1 and 0.15≤x<1 (such as 0.15≤x≤0.4). In an embodiment, 0,2≤x<1 (such as 0.2≤x<0.4). In such an embodiment, M' is $Al^{3+}$ and M is either absent or is $Zn^{2+}$.

In order to form the layered double hydroxide, an anion X is required. X may be selected from a halide, an inorganic oxyanion, an anionic surfactant, an anionic chromophore and an anionic UV absorber. Suitably, X is an inorganic oxyanion.

In an embodiment, X is selected from carbonate, bicarbonate, phosphate, hydrogenphosphate, dihydrogenphosphate, nitrate, nitrite, borate and sulphate. Suitably, X is selected from carbonate, phosphate, hydrogenphosphate, nitrate and sulphate.

In a particularly suitable embodiment, X comprises >75 wt % (or >85 wt % or 95 wt % or >99 wt %) carbonate. Suitably, X is carbonate.

As the processes described herein comprise preparing a magnesium-containing layered double hydroxide from a magnesium phosphate-containing mineral, when X is phosphate it is not necessarily required that phosphate is separately added in step a), since the phosphate anion may be derived from the magnesium phosphate-containing mineral. When X is an anion other than phosphate, it is necessary that a source of X is added in step a).

Therefore, in an embodiment, the layered double hydroxide is a phosphate-containing layered double hydroxide and step a) further comprises using the magnesium phosphate-containing mineral as a source of phosphate ions in the process of preparing the layered double hydroxide.

In a particularly suitable embodiment, the layered double hydroxide is a magnesium aluminium carbonate layered double hydroxide or a magnesium zinc aluminium carbonate layered double hydroxide. In such an embodiment, M' is $Al^{3+}$, M is either absent or is $Zn^{2+}$, and X is carbonate.

In a particularly suitable embodiment, the layered double hydroxide is a $Mg_{1-x}Al_xCO_3$ layered double hydroxide or a $(Mg_uZn_w)_{1-x}Al_xCO_3$ layered double hydroxide, wherein u+w=1 and 0.15≤x<1 (such as 0.15≤x≤0.4). In an embodiment, 0.2≤x<1 (such as 0.2≤x≤0.4). In such an embodiment, M' is $Al^{3+}$, M is either absent or is $Zn^{2+}$, and X is carbonate.

Any ammonia generated during the ageing period may be removed (e.g. as $NH_4Cl$).

Magnesium-Containing LDHs of the Invention

In a second aspect, the present invention provides a magnesium-containing layered double hydroxide obtainable, obtained or directly obtained by a process defined herein.

In a third aspect, the present invention provides a magnesium-containing-layered double hydroxide having a specific surface area of ≥80 $m^2$ $g^{-1}$ and a tap density of at least 0.25 g $cm^{-3}$.

As mentioned hereinbefore, the process of the first aspect provides a convenient and inexpensive route towards preparing a variety of magnesium-containing layered double hydroxides. Moreover, the inventors have determined that these magnesium-containing layered double hydroxides exhibit unexpectedly interesting physical properties that make them attractive candidates for industry.

The following paragraphs apply to either or both of the second and third aspects of the invention.

The magnesium-containing layered double hydroxide may have a specific surface area as determined by $N_2$ adsorption by BET analysis—referred to herein as a BET specific surface area—of at least 50 $m^2$/g. Suitably, the magnesium-containing layered double hydroxide has a BET specific surface area of at least 100 $m^2$/g. More suitably, the magnesium-containing layered double hydroxide has a BET specific surface area of at least 140 $m^2$/g. Even more suitably, the magnesium-containing layered double hydroxide has a BET specific surface area of at least 200 $m^2$/g. Even more suitably, the magnesium-containing layered double hydroxide has a BET specific surface area of at least 250 $m^2$/g.

The magnesium-containing layered double hydroxide may have a tap density of at least 0.25 g $cm^{-3}$. Tap density can be calculated by standard testing method (ASTM D7481-09). The powder was filled into a volumetric cylinder and a precise weight of sample (m) was measured. The volume was measured before ($V_0$) and after 1000 taps ($V_t$), with the volume recorded after every 100 taps. The loose bulk and tap densities were calculated by: Loose bulk density=m/$V_0$; Tap density=m/$V_t$. Suitably, the magnesium-containing layered double hydroxide has a tap density of at least 0.30 g $cm^{-3}$. More suitably, the magnesium-containing layered double hydroxide has a tap density of at least 0.32 g $cm^{-3}$. Most suitably, the magnesium-containing layered double hydroxide has a tap density of at least 0.35 g $cm^{-3}$.

In one particularly suitable embodiment, the magnesium-containing layered double hydroxide has a BET specific surface area of at least 80 $m^2$/g and a tap density of at least 0.25 g $cm^{-3}$. LDHs having both high surface area and high density are particularly desirable. Higher surface area materials are generally preferred in the field of catalysis whilst higher density materials are preferred in industry due to lower volume needed and their improved compoundability. In particular, it is desirable that a catalytic material of a given surface area is as dense as possible, since this means that a quantity of catalytic material required to perform a given catalytic process occupies the least amount of volume possible. Maximising the number of catalytic sites of the catalytic material per unit volume of the catalytic material means that reactors of lower overall volume can be used, thereby representing a notable cost saving. Furthermore, a more efficiently packed (i.e. denser) reactor bed of catalytic material is more thermally conductive, allowing for improvements in energy efficiency. Suitably, the magnesium-containing layered double hydroxide has a BET specific surface area of at least 100 $m^2$/g and a tap density of at least 0.25 g $cm^{-3}$. Most suitably, the magnesium-containing layered double hydroxide has a BET specific surface area of at least 140 $m^2$/g and a tap density of at least 0.25 g $cm^{-3}$. The magnesium-containing layered double hydroxide is suitably a magnesium aluminium layered double hydroxide (e.g. a magnesium aluminium carbonate layered double hydroxide).

In another particularly suitable embodiment, the magnesium-containing layered double hydroxide has a BET specific surface area of at least 80 $m^2/g$ and a tap density of at least 0.25 g $cm^{-3}$. LDHs having both high surface area and high density are particularly desirable Higher surface area materials are generally preferred in the field of catalysis whilst higher density materials are preferred in industry due to lower volume needed and their improved compoundability. In particular, it is desirable that a catalytic material of a given surface area is as dense as possible, since this means that a quantity of catalytic material required to perform a given catalytic process occupies the least amount of volume possible. Maximising the number of catalytic sites of the catalytic material per unit volume of the catalytic material means that reactors of lower overall volume can be used, thereby representing a notable cost saving. Furthermore, a more efficiently packed (i.e. denser) reactor bed of catalytic material is more thermally conductive, allowing for improvements in energy efficiency. Suitably, the magnesium-containing layered double hydroxide has a BET specific surface area of at least 80 $m^2/g$ and a tap density of at least 0.30 g $cm^{-3}$. More suitably, the magnesium-containing layered double hydroxide has a BET specific surface area of at least 80 $m^2/g$ and a tap density of at least 0.32 g $cm^{-3}$. Most suitably, the magnesium-containing layered double hydroxide has a BET specific surface area of at least 80 $m^2/g$ and a tap density of at least 0.35 g $cm^{-3}$. The magnesium-containing layered double hydroxide is suitably a magnesium aluminium layered double hydroxide (e.g. a magnesium aluminium carbonate layered double hydroxide).

In another particularly suitable embodiment, the magnesium-containing layered double hydroxide has a BET specific surface area of at least 80 $m^2/g$ and a tap density of at least 0.25 g $cm^{-3}$. LDHs having both high surface area and high density are particularly desirable Higher surface area materials are generally preferred in the field of catalysis whilst higher density materials are preferred in industry due to lower volume needed and their improved compoundability. In particular, it is desirable that a catalytic material of a given surface area is as dense as possible, since this means that a quantity of catalytic material required to perform a given catalytic process occupies the least amount of volume possible. Maximising the number of catalytic sites of the catalytic material per unit volume of the catalytic material means that reactors of lower overall volume can be used, thereby representing a notable cost saving. Furthermore, a more efficiently packed (i.e. denser) reactor bed of catalytic material is more thermally conductive, allowing for improvements in energy efficiency. Suitably, the magnesium-containing layered double hydroxide has a BET specific surface area of at least 100 $m^2/g$ and a tap density of at least 0.30 g $cm^{-3}$. More suitably, the magnesium-containing layered double hydroxide has a BET specific surface area of at least 100 $m^2/g$ and a tap density of at least 0.32 g $cm^{-3}$. Most suitably, the magnesium-containing layered double hydroxide has a BET specific surface area of at least 140 $m^2/g$ and a tap density of at least 0.35 g $cm^{-3}$. The magnesium-containing layered double hydroxide is suitably a magnesium aluminium layered double hydroxide (e.g. a magnesium aluminium carbonate layered double hydroxide).

In another particularly suitable embodiment, the magnesium-containing layered double hydroxide has a BET specific surface area of at least 120 $m^2/g$ and a tap density of at least 0.45 g $cm^{-3}$. LDHs having both high surface area and high density are particularly desirable Higher surface area materials are generally preferred in the field of catalysis whilst higher density materials are preferred in industry due to lower volume needed and their improved compoundability. In particular, it is desirable that a catalytic material of a given surface area is as dense as possible, since this means that a quantity of catalytic material required to perform a given catalytic process occupies the least amount of volume possible. Maximising the number of catalytic sites of the catalytic material per unit volume of the catalytic material means that reactors of lower overall volume can be used, thereby representing a notable cost saving. Furthermore, a more efficiently packed (i.e. denser) reactor bed of catalytic material is more thermally conductive, allowing for improvements in energy efficiency. Suitably, the magnesium-containing layered double hydroxide has a BET specific surface area of at least 125 $m^2/g$ and a tap density of at least 0.50 g $cm^{-3}$. More suitably, the magnesium-containing layered double hydroxide has a BET specific surface area of at least 130 $m^2/g$ and a tap density of at least 0.55 g $cm^{-3}$. Even more suitably, the magnesium-containing layered double hydroxide has a BET specific surface area of at least 135 $m^2/g$ and a tap density of at least 0.60 g $cm^{-3}$. Most suitably, the magnesium-containing layered double hydroxide has a BET specific surface area of at least 170 $m^2/g$ and a tap density of at least 0.62 g $cm^{-3}$. The magnesium-containing layered double hydroxide is suitably a magnesium aluminium layered double hydroxide (e.g. a magnesium aluminium carbonate layered double hydroxide).

The magnesium-containing layered double hydroxide may have mesoporosity. Mesoporosity, as referred to herein, means pore widths between 2 and 50 nm (J. Rouquerol et al., *Pure & Applied Chem*. (1994), 66, 1739-1758). Suitably, the magnesium-containing layered double hydroxide has a pore size of 2 to 50 nm. More suitably, the magnesium-containing layered double hydroxide has a pore size of 2 to 25 nm. Yet more suitably, the magnesium-containing layered double hydroxide has a pore size of 6 to 25 nm. Most suitably, the magnesium-containing layered double hydroxide has a pore size of 6 to 10 nm.

The magnesium-containing layered double hydroxide may have a platelet or platelet-like morphology. In an embodiment, the magnesium-containing layered double hydroxide exists as nanosheets. In an embodiment, the magnesium-containing layered double hydroxide has a hierarchical structure comprising stacked nanosheets. Suitably, the stacked nanosheets comprise slit-shaped mesopores.

It will be understood that the magnesium-containing layered double hydroxide may, in terms of its structure, composition or properties, having any of those definitions appearing hereinbefore in relation to the first aspect of the invention.

In a particularly suitable embodiment, $Mg^{2+}$ is the only monovalent or divalent cation in the magnesium-containing layered double hydroxide.

In another particularly suitable embodiment, the magnesium-containing layered double hydroxide comprises carbonate as the interlayer anion (i.e. the layer between positively charged layers of mixed-metal hydroxides). Suitably, carbonate accounts for >75 wt % (or >85 wt % or 95 wt %) of all interlayer anions present in the magnesium-containing layered double hydroxide. More suitably, carbonate is the only interlayer anion present in the magnesium-containing layered double hydroxide.

In another particularly suitable embodiment, the magnesium-containing layered double hydroxide is a MgAl layered double hydroxide or a MgZnAl layered double hydroxide. Suitably, carbonate accounts for >75 wt % (or >85 wt % or 95 wt %) of all interlayer anions present in the magnesium-containing layered double hydroxide. More suitably, carbonate is the only interlayer anion present in the magnesium-containing layered double hydroxide.

In another particularly suitable embodiment, the magnesium-containing layered double hydroxide is a $Mg_{1-x}Al_x$ layered double hydroxide or a $(Mg_uZn_w)_{1-x}Al_x$ layered double hydroxide, wherein u+w=1 and 0.15≤x<1 (such as 0.15≤x<0.4). Alternatively, 0.2≤x<1 (such as 0.2≤x≤0.4). Suitably, carbonate accounts for >75 wt % (or >85 wt % or 95 wt %) of all interlayer anions present in the magnesium-containing layered double hydroxide. More suitably, carbonate is the only interlayer anion present in the magnesium-containing layered double hydroxide.

In an embodiment, the magnesium-containing layered double hydroxide comprises a trace quantity of one or more impurities derived from struvite. Typical impurities that may be derived from struvite according to a process of the present invention, include $Mg_3(PO_4)_2.8H_2O$ (bobierrite), $Mg_2P_2O_7$, $(NH_4)Mg(PO_4).H_2O$ (dittmarite) and $Mg(HPO_4).3H_2O$ (newberyite). Suitably, the magnesium-containing layered double hydroxide comprises a trace quantity of $Mg_3(PO_4)_2.8H_2O$ (bobierrite) and/or $Mg_2P_2O_7$.

As discussed hereinbefore, in a third aspect, the present invention provides a magnesium-containing-layered double hydroxide having a specific surface area of ≥80 $m^2$ $g^{-1}$ and a tap density of at least 0.25 g $cm^{-3}$. The magnesium-containing-layered double hydroxide may (e.g. in terms of its structure, composition and/or morphology) have any of those definitions discussed hereinbefore in relation to the other aspects of the invention.

Uses of the LDHs

In a fourth aspect, the present invention provides a use of a magnesium-containing layered double hydroxide according to the second or third aspect as a sorbent, a catalytic support or a filler in a composite material.

The LDHs of the present invention have a variety of interesting properties that make them attractive materials for use as fillers in polymeric composites, support materials for heterogenous catalysts, or as sorbent materials. Moreover, LDHs of the present invention, once thermally treated (e.g. calcined), result in layered double oxides having properties that make them apt for use carbon capture applications.

Layered Double Oxides

In a fifth aspect, there is provided a thermally-treated (e.g. calcined) magnesium-containing layered double hydroxide according to the second or third aspect.

In a sixth aspect, there is provided a layered double oxide obtained, obtainable or directly obtained by thermally-treating (e.g. calcining) a magnesium-containing layered double hydroxide according to the second or third aspect.

The term "layered double oxide" will be familiar to one of ordinary skill in the art. Indeed, it will be clear to one of ordinary skill in the art that thermally-treating a layered double hydroxide at a temperature of 200-850° C. results in the formation of a layered double oxide (sometimes referred to as a mixed metal oxide). Some layered double oxides can be readily converted back into layered double hydroxides by a rehydration reconstruction process.

As used herein, unless otherwise specified, the term "thermal treatment" (or "thermally treated") refers to thermal treatment at a temperature of 200-850° C.

As used herein, the term "calcining" (or "calcined") refers to thermal treatment at a temperature of 300-500° C.

In a seventh aspect, there is provided a use of a thermally-treated (e.g. calcined) magnesium-containing layered double hydroxide according to the fifth aspect, or a layered double oxide according to the sixth aspect, as a sorbent. Suitably, the sorbent is used to adsorb $CO_2$.

The inventors have surprisingly determined that the materials of the fifth and sixth aspects of the invention, which are derived from magnesium phosphate-containing minerals, are notably more active in the sorption of $CO_2$ than conventional LDOs and commercial LDOs.

The following numbered statements 1-99 are not claims, but instead describe various aspects and embodiments of the invention:

1. A process for the preparation of a magnesium-containing layered double hydroxide, the process comprising the step of:
   a) using a magnesium phosphate-containing mineral as a source of $Mg^{2+}$ ions in a process of preparing a layered double hydroxide.
2. The process of statement 1, wherein the magnesium phosphate-containing mineral is struvite or a magnesium phosphate-containing mineral derived from struvite (e.g. bobierrite).
3. The process of statement 1 or 2, wherein the layered double hydroxide preparation process of step a) is a coprecipitation process.
4. The process of statements 1 to 3, wherein $Mg^{2+}$ ions are generated in step a) by contacting the magnesium phosphate-containing mineral with an aqueous solution (e.g. water).
5. The process of statement 4, wherein the temperature of the aqueous solution is 5-120° C.
6. The process of statement 4, wherein the temperature of the aqueous solution is 20-99° C.
7. The process of statement 4, wherein the temperature of the aqueous solution is 30-95° C.
8. The process of statement 4, wherein the temperature of the aqueous solution is 50-95° C.
9. The process of statement 4, wherein the temperature of the aqueous solution is 55-90° C.
10. The process of statement 4, wherein the temperature of the aqueous solution is 75-90° C.
11. The process of any preceding statement, wherein step a) comprises mixing the $Mg^{2+}$ ions with:
   at least one M', wherein M' is a trivalent or tetravalent cation,
   at least one X, wherein X is an anion, and
   optionally M, wherein M is a monovalent or divalent cation other than $Mg^{2+}$, in an aqueous reaction medium (e.g. water) at a pH sufficient to form a layered double hydroxide.
12. The process of statement 11, wherein M is absent.
13. The process of statement 11 or 12, wherein the pH of the aqueous reaction medium is 9.5-13.0.
14. The process of statement 11, 12 or 13, wherein the pH of the aqueous reaction medium is 11.0-12.0.
15. The process of any one of statements 11 to 14, wherein the temperature of the aqueous reaction medium is 5-80° C.
16. The process of any one of statements 11 to 15, wherein the temperature of the aqueous reaction medium is 15-55° C.
17. The process of any one of statements 11 to 16, wherein the temperature of the aqueous reaction medium is 25-45° C.

18. The process of any one of statements 11 to 17, wherein the formed layered double hydroxide is aged in the aqueous reaction medium for 1-200 hours.

19. The process of any one of statements 11 to 18, wherein the formed layered double hydroxide is aged in the aqueous reaction medium for 12-150 hours.

20. The process of any one of statement 11 to 19, wherein the formed layered double hydroxide is aged in the aqueous reaction medium for 24-100 hours.

21. The process of any one of statements 11 to 20, wherein the formed layered double hydroxide is aged in the aqueous reaction medium for 36-72 hours.

22. The process of any one of statements 11 to 21, wherein the formed layered double hydroxide is isolated from the aqueous reaction medium and then washed with water.

23. The process of statement 22, wherein the isolated, washed layered double hydroxide is dried, optionally under vacuum.

24. The process of any one of statements 11 to 23, wherein M' is selected from $Al^{3+}$, $Ga^{3+}$, $Y^{3+}$, $In^{3+}$, $Fe^{3+}$, $Co^{3+}$, $Ni^{3+}$, $Mn^{3+}$, $Cr^{3+}$, $Ti^{3+}$, $V^{3+}$, $La^{3+}$, $Sn^{4+}$, $Ti^{4+}$ and $Zr^{4+}$.

25. The process of any one of statements 11 to 24, wherein M' is selected from $Al^{3+}$, $Fe^{3+}$, $Co^{3+}$ and $Ti^{3+}$.

26. The process of any one of statements 11 to 25, wherein M' is $Al^{3+}$.

27. The process of any one of statements 11 to 26, wherein M, when present, is selected from $Li^{+}$, $Ca^{2+}$, $Zn^{2+}$, $Fe^{2+}$, $Ni^{2+}$, $Co^{2+}$, $Mn^{2+}$ and $Cu^{2+}$.

28. The process of any one of statements 11 to 27, wherein M, when present, is selected from $Ca^{2+}$ and $Zn^{2+}$.

29. The process of any preceding statement, wherein the layered double hydroxide is a MgAl layered double hydroxide or a MgZnAl layered double hydroxide.

30. The process of any preceding statement, wherein the layered double hydroxide is a $Mg_{1-x}Al_x$ layered double hydroxide or a $(Mg_uZn_w)_{1-x}Al_x$ layered double hydroxide, wherein u+w=1 and $0.15 \leq x < 1$.

31. The process of statement 30, wherein $0.2 \leq x \leq 0.4$.

32. The process of any one of statements 11 to 31, wherein X is selected from a halide, an inorganic oxyanion, an anionic surfactant, an anionic chromophore and an anionic UV absorber.

33. The process of any one of statements 11 to 32, wherein X is an inorganic oxyanion.

34. The process of any one of statements 11 to 33, wherein X is selected from carbonate, bicarbonate, phosphate, hydrogenphosphate, dihydrogenphosphate, nitrate, nitrite, borate and sulphate.

35. The process of any one of statements 11 to 34, wherein X is selected from carbonate, phosphate, hydrogenphosphate, nitrate and sulphate.

36. The process of any one of statements 11 to 35, wherein X comprises >75 wt % carbonate.

37. The process of any preceding statement, wherein the layered double hydroxide is a phosphate-containing layered double hydroxide and step a) further comprises using the magnesium phosphate-containing mineral as a source of phosphate ions in the process of preparing the layered double hydroxide.

38. The process of any preceding statement, wherein the layered double hydroxide is a magnesium aluminium carbonate layered double hydroxide or a magnesium zinc aluminium carbonate layered double hydroxide.

39. The process of any preceding statement, wherein the layered double hydroxide is a $Mg_{1-x}Al_xCO_3$ layered double hydroxide or a $(Mg_uZn_w)_{1-x}Al_xCO_3$ layered double hydroxide, wherein u+w=1 and $0.15 \leq x < 1$ (such as $0.15 \leq x \leq 0.4$ or $0.2 \leq x \leq 0.4$).

40. The process of any preceding statement, wherein ammonia generated during step a) is removed (e.g. as $NH_4Cl$).

41. A magnesium-containing layered double hydroxide obtainable by the process of any preceding statement.

42. The magnesium-containing layered double hydroxide of statement 41, wherein the layered double hydroxide has a BET specific surface area of $\geq 50\ m^2\ g^{-1}$.

43. The magnesium-containing layered double hydroxide of statement 41, wherein the layered double hydroxide has a BET specific surface area of $\geq 80\ m^2\ g^{-1}$.

44. The magnesium-containing layered double hydroxide of statement 41, wherein the layered double hydroxide has a BET specific surface area of $\geq 100\ m^2\ g^{-1}$.

45. The magnesium-containing layered double hydroxide of statement 41, wherein the layered double hydroxide has a BET specific surface area of $\geq 140\ m^2\ g^{-1}$.

46. The magnesium-containing layered double hydroxide of statement 41, wherein the layered double hydroxide has a BET specific surface area of $\geq 200\ m^2\ g^{-1}$.

47. The magnesium-containing layered double hydroxide of statement 41, wherein the layered double hydroxide has a BET specific surface area of $\geq 250\ m^2\ g^{-1}$.

48. The magnesium-containing layered double hydroxide of any one of statements 41 to 47, wherein the layered double hydroxide has a tap density of at least 0.25 g $cm^{-3}$.

49. The magnesium-containing layered double hydroxide of any one of statements 41 to 47, wherein the layered double hydroxide has a tap density of at least 0.30 g $cm^{-3}$.

50. The magnesium-containing layered double hydroxide of any one of statements 41 to 47, wherein the layered double hydroxide has a tap density of at least 0.35 g $cm^{-3}$.

51. The magnesium-containing layered double hydroxide of statement 41, wherein the layered double hydroxide has a BET specific surface area of $\geq 80\ m^2\ g^{-1}$ and a tap density of at least 0.25 g $cm^{-3}$.

52. The magnesium-containing layered double hydroxide of statement 41, wherein the layered double hydroxide has a BET specific surface area of $\geq 100\ m^2\ g^{-1}$ and a tap density of at least 0.30 g $cm^{-3}$.

53. The magnesium-containing layered double hydroxide of statement 41, wherein the layered double hydroxide has a BET specific surface area of $\geq 140\ m^2\ g^{-1}$ and a tap density of at least 0.35 g $cm^{-3}$.

54. The magnesium-containing layered double hydroxide of any one of statements 41 to 53, wherein the layered double hydroxide has mesoporosity.

55. The magnesium-containing layered double hydroxide of any one of statements 41 to 54, wherein the layered double hydroxide demonstrates a $N_2$ adsorption-desorption type IV isotherm.

56. The magnesium-containing layered double hydroxide of statement 55, wherein the $N_2$ adsorption-desorption type IV isotherm has a H3 type hysteresis loop.

57. The magnesium-containing layered double hydroxide of any one of statements 41 to 56, wherein the layered double hydroxide has a platelet morphology.

58. The magnesium-containing layered double hydroxide of any one of statements 41 to 57, wherein the layered double hydroxide comprises a trace quantity of one or more impurities derived from the magnesium phosphate-containing mineral.

59. A magnesium-containing-layered double hydroxide having a BET specific surface area of ≥80 $m^2$ $g^{-1}$ and a tap density of at least 0.25 g $cm^{-3}$.

60. The magnesium-containing layered double hydroxide of statement 59, wherein the layered double hydroxide has a BET specific surface area of ≥100 $m^2$ $g^{-1}$.

61. The magnesium-containing layered double hydroxide of statement 59, wherein the layered double hydroxide has a BET specific surface area of ≥130 $m^2$ g−1.

62. The magnesium-containing layered double hydroxide of statement 59, wherein the layered double hydroxide has a BET specific surface area of ≥135 $m^2$ $g^{-1}$.

63. The magnesium-containing layered double hydroxide of statement 59, wherein the layered double hydroxide has a BET specific surface area of ≥140 $m^2$ $g^{-1}$.

64. The magnesium-containing layered double hydroxide of statement 59, wherein the layered double hydroxide has a BET specific surface area of ≥170 $m^2$ $g^{-1}$.

65. The magnesium-containing layered double hydroxide of statement 59, wherein the layered double hydroxide has a BET specific surface area of ≥200 $m^2$ $g^{-1}$.

66. The magnesium-containing layered double hydroxide of statement 59, wherein the layered double hydroxide has a BET specific surface area of ≥250 $m^2$ $g^{-1}$.

67. The magnesium-containing layered double hydroxide of any one of statements 59 to 66, wherein the layered double hydroxide has a tap density of at least 0.30 g $cm^{-3}$.

68. The magnesium-containing layered double hydroxide of any one of statements 59 to 66, wherein the layered double hydroxide has a tap density of at least 0.32 g $cm^{-3}$.

69. The magnesium-containing layered double hydroxide of any one of statements 59 to 66, wherein the layered double hydroxide has a tap density of at least 0.35 g $cm^{-3}$.

70. The magnesium-containing layered double hydroxide of any one of statements 59 to 66, wherein the layered double hydroxide has a tap density of at least 0.45 g $cm^{-3}$.

71. The magnesium-containing layered double hydroxide of any one of statements 59 to 66, wherein the layered double hydroxide has a tap density of at least 0.50 g $cm^{-3}$.

72. The magnesium-containing layered double hydroxide of any one of statements 59 to 66, wherein the layered double hydroxide has a tap density of at least 0.55 g $cm^{-3}$.

73. The magnesium-containing layered double hydroxide of any one of statements 59 to 66, wherein the layered double hydroxide has a tap density of at least 0.60 g $cm^{-3}$.

74. The magnesium-containing layered double hydroxide of any one of statements 59 to 66, wherein the layered double hydroxide has a tap density of at least 0.62 g $cm^{-3}$.

75. The magnesium-containing layered double hydroxide of statement 59, wherein the layered double hydroxide has a BET specific surface area of ≥100 $m^2$ $g^{-1}$ and a tap density of at least 0.30 g $cm^{-3}$.

76. The magnesium-containing layered double hydroxide of statement 59, wherein the layered double hydroxide has a BET specific surface area of ≥100 $m^2$ $g^{-1}$ and a tap density of at least 0.32 g $cm^{-3}$.

77. The magnesium-containing layered double hydroxide of statement 59, wherein the layered double hydroxide has a BET specific surface area of ≥140 $m^2$ $g^{-1}$ and a tap density of at least 0.35 g $cm^{-3}$.

78. The magnesium-containing layered double hydroxide of any one of statements 5559 to 77, wherein the layered double hydroxide has mesoporosity.

79. The magnesium-containing layered double hydroxide of any one of statements 59 to 78, wherein the layered double hydroxide demonstrates a $N_2$ adsorption-desorption type IV isotherm.

80. The magnesium-containing layered double hydroxide of statement 79, wherein the $N_2$ adsorption-desorption type IV isotherm has a H3 type hysteresis loop.

81. The magnesium-containing layered double hydroxide of any one of statements 59 to 80, wherein the layered double hydroxide has a platelet morphology.

82. The magnesium-containing layered double hydroxide of any one of statements 59 to 81, wherein the layered double hydroxide comprises a trace quantity of one or more impurities derived from the magnesium phosphate-containing mineral.

83. The magnesium-containing layered double hydroxide of any one of statements 59 to 82, wherein the magnesium-containing layered double hydroxide comprises at least one trivalent or tetravalent cation selected from the group consisting of $Al^{3+}$, $Ga^{3+}$, $Y^{3+}$, $In^{3+}$, $Fe^{3+}$, $Co^{3+}$, $Ni^{3+}$, $Mn^{3+}$, $Cr^{3+}$, $Ti^{3+}$, $V^{3+}$, $La^{3+}$, $Sn^{4+}$, $Ti^{4+}$ and $Zr^{4+}$.

84. The magnesium-containing layered double hydroxide of statement 83, wherein the at least one trivalent or tetravalent cation is selected from the group consisting of $Al^{3+}$, $Fe^{3+}$, $Co^{3+}$ and $Ti^{3+}$.

85. The magnesium-containing layered double hydroxide of statement 83, wherein the at least one trivalent or tetravalent cation is $Al^{3+}$.

86. The magnesium-containing layered double hydroxide of any one of statements 59 to 85, wherein the magnesium-containing layered double hydroxide comprises at least one anion X selected from the group consisting of a halide, an inorganic oxyanion, an anionic surfactant, an anionic chromophore and an anionic UV absorber.

87. The magnesium-containing layered double hydroxide of statement 86, wherein X is an inorganic oxyanion.

88. The magnesium-containing layered double hydroxide of statement 87, wherein X is selected from carbonate, bicarbonate, phosphate, hydrogenphosphate, dihydrogenphosphate, nitrate, nitrite, borate and sulphate.

89. The magnesium-containing layered double hydroxide of statement 87, wherein X is selected from carbonate, phosphate, hydrogenphosphate, nitrate and sulphate.

90. The magnesium-containing layered double hydroxide of statement 87, wherein >75 wt % of X is carbonate.

91. The magnesium-containing layered double hydroxide of statement 87, wherein X carbonate.

92. The magnesium-containing layered double hydroxide of any one of statements 59 to 91, wherein the layered double hydroxide is a MgAl layered double hydroxide or a MgZnAl layered double hydroxide.

93. The magnesium-containing layered double hydroxide of statement 92, wherein the layered double hydroxide is a $Mg_{1-x}Al_x$ layered double hydroxide or a $(Mg_uZn_w)_{1-x}Al_x$ layered double hydroxide, wherein u+w=1 and 0.15≤x<1.

94. The magnesium-containing layered double hydroxide of statement 93, wherein

95. Use of the magnesium-containing layered double hydroxide as claimed in any one of statements 41 to 94 as a sorbent, a catalytic support or as a filler in a composite material.

96. A thermally-treated (e.g. calcined) magnesium-containing layered double hydroxide as described in any one of statements 41 to 94.

97. A layered double oxide obtained, obtainable or directly obtained by thermally-treating (e.g. calcining) a magnesium-containing layered double hydroxide as described in any one of statements 41 to 94.

98. Use of a thermally-treated (e.g. calcined) magnesium-containing layered double hydroxide according to statement 96 or a layered double oxide according to statement 97 as a sorbent.

99. The use of statement 98, wherein the sorbet is used in the sorption of $CO_2$.

EXAMPLES

Embodiments of the invention will now be described, for the purpose of illustration only, with reference to the accompanying figures, in which.

Figure 7:
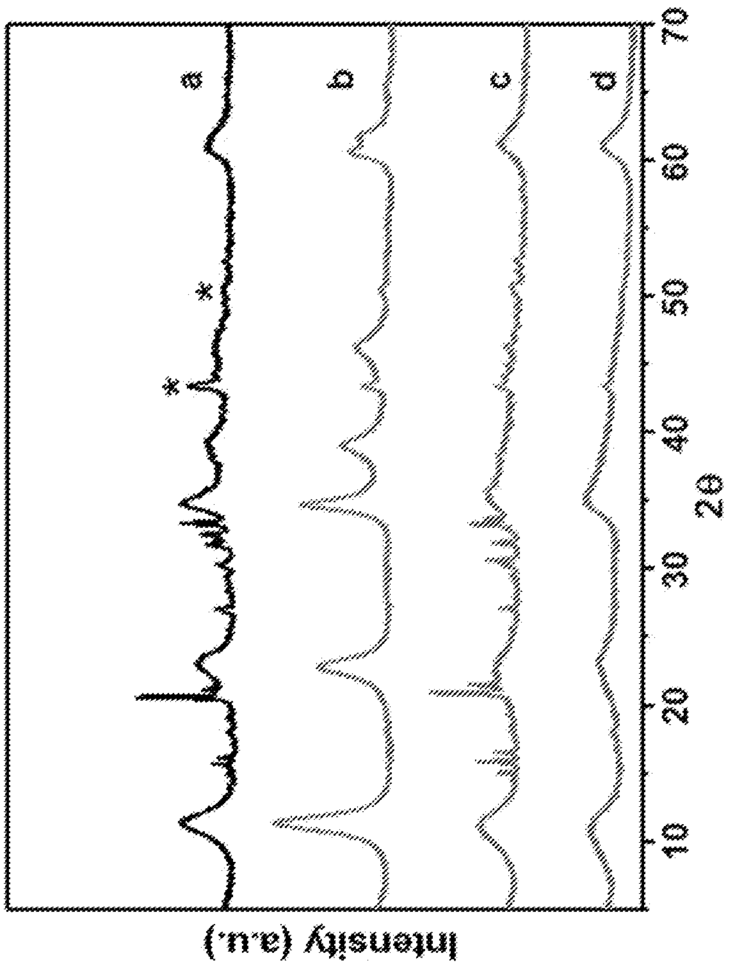

FIG. 7 shows XRPD patterns of (a) Example 1.1 after 3 days ageing; (b) the LDH of Example 1.1 after 5 days ageing; (c) the LDH of Example 1.2 after 3 days ageing; and (d) the LDH of Example 1.2 after 5 days ageing.

Figure 8:
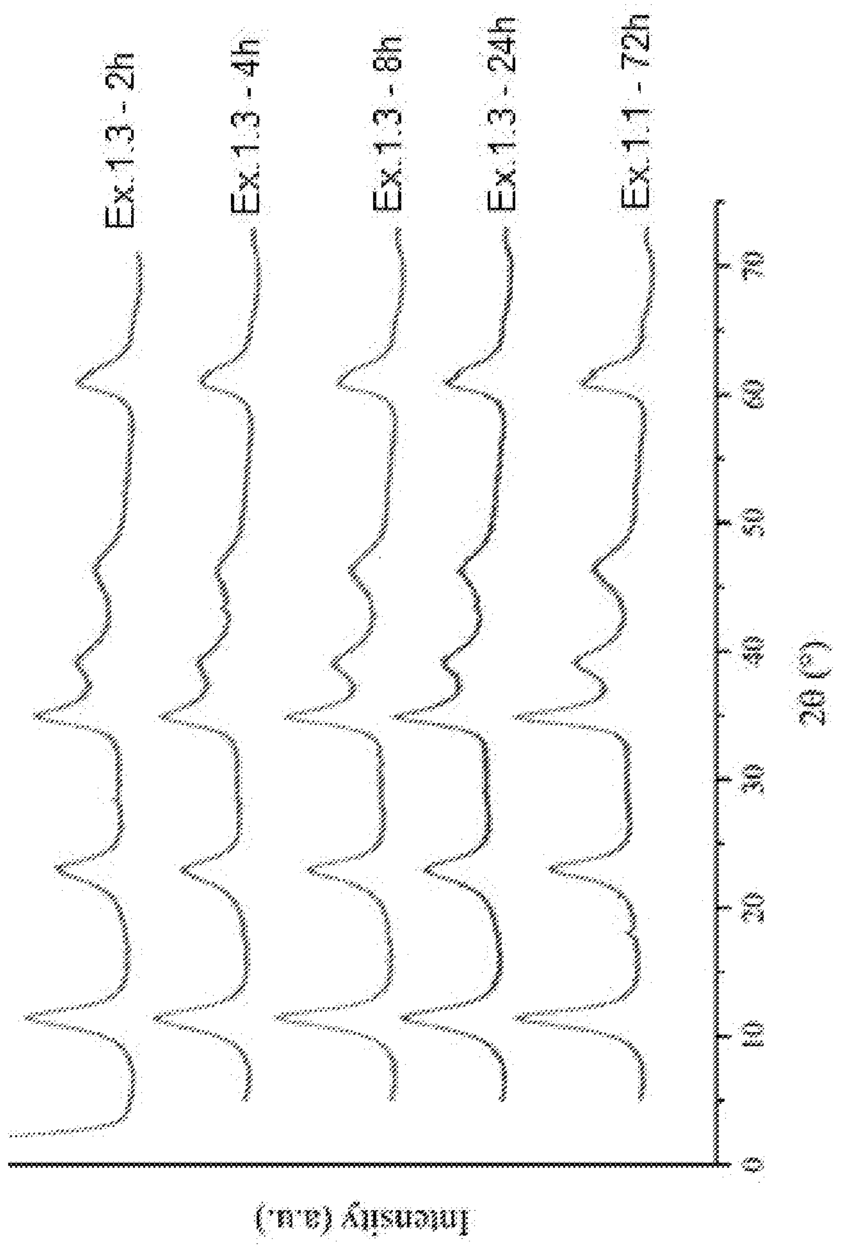

FIG. 8 shows XRPD patterns of the LDH of Example 1.3 after 2, 4, 8 and 24 h ageing and the LDH of Example 1.1 after 72 h ageing.

Figure 9:
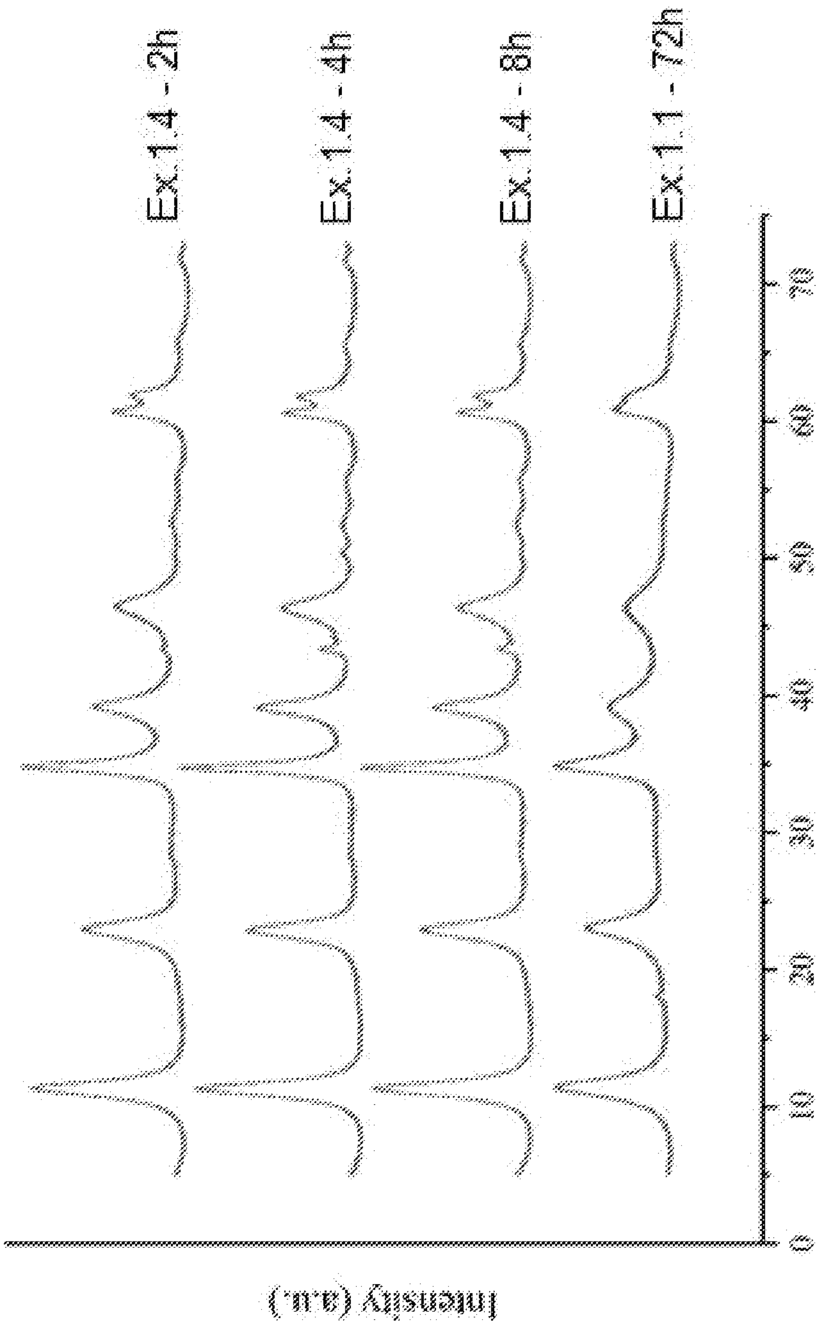

FIG. 9 shows XRPD patterns of the LDH of Example 1.4 after 2, 4 and 8 h ageing and the LDH of Example 1.1 after 72 h ageing.

Figure 10:
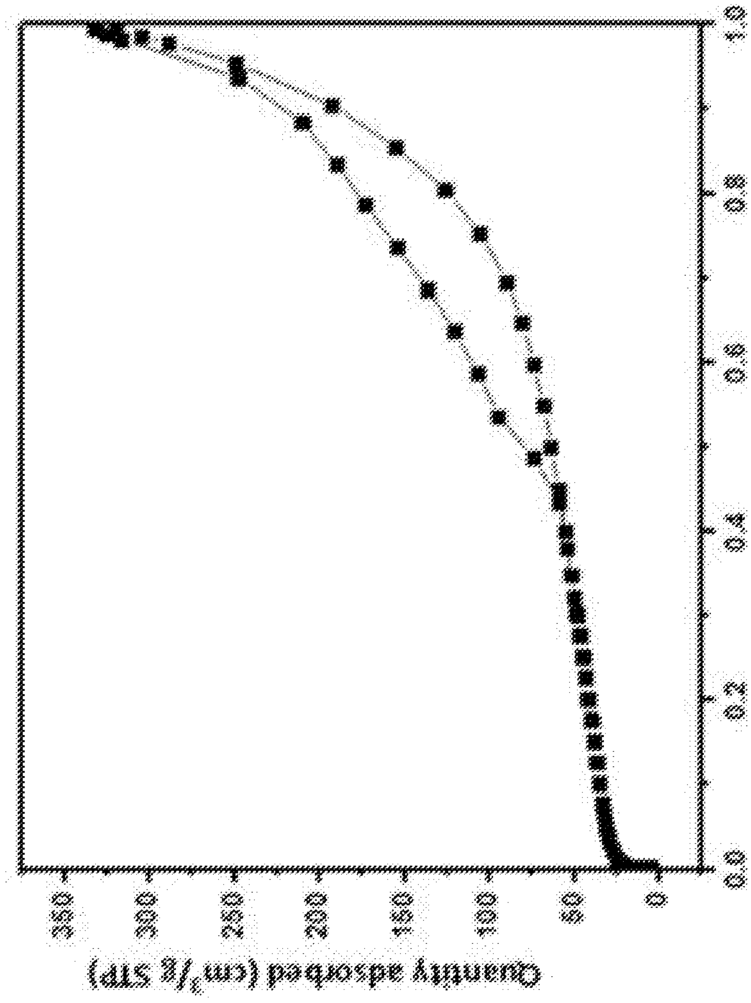

FIG. 10 shows the nitrogen adsorption/desorption isotherm for the LDH of Example 1.1.

Figure 11:
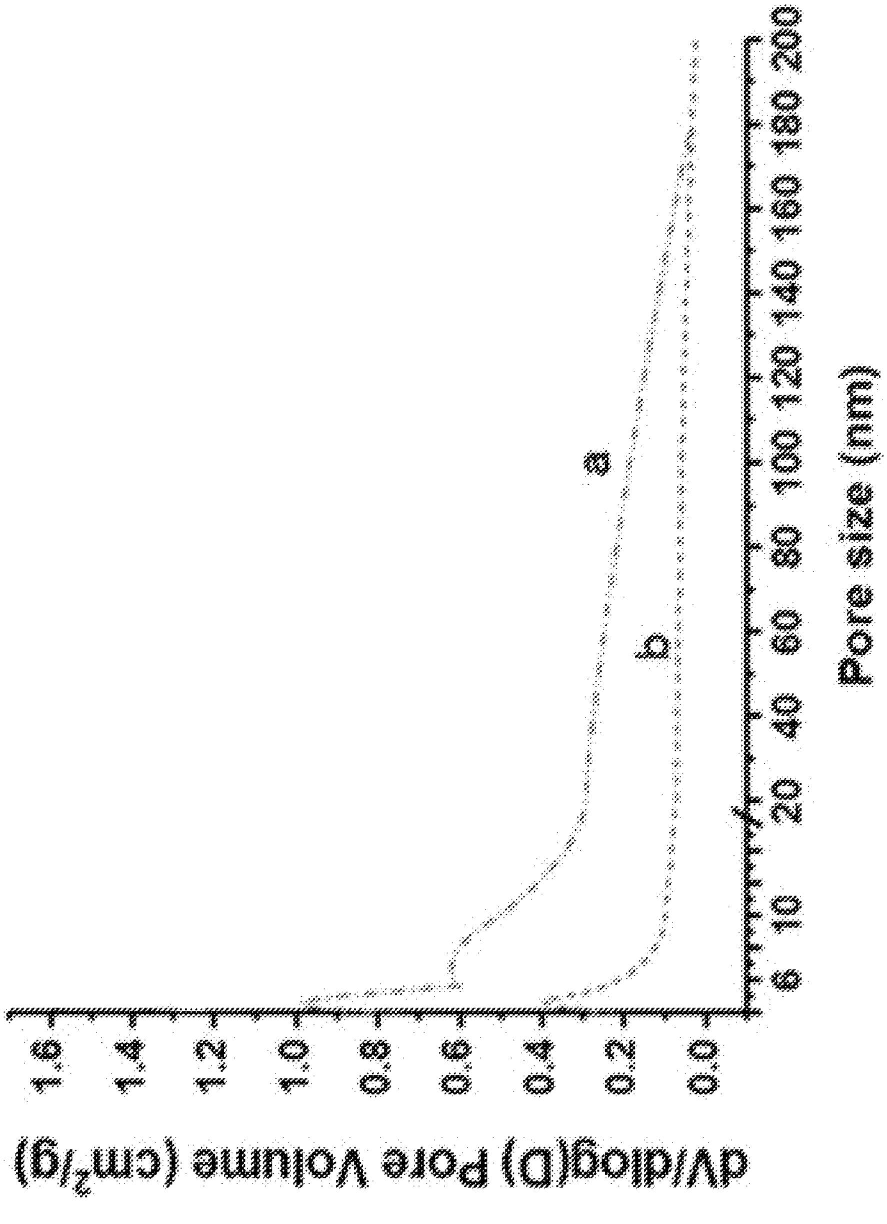

FIG. 11 shows the pore size distribution of (a) the LDH of Example 1.1; and (b) the LDH of Example 3.1.

Figure 12:
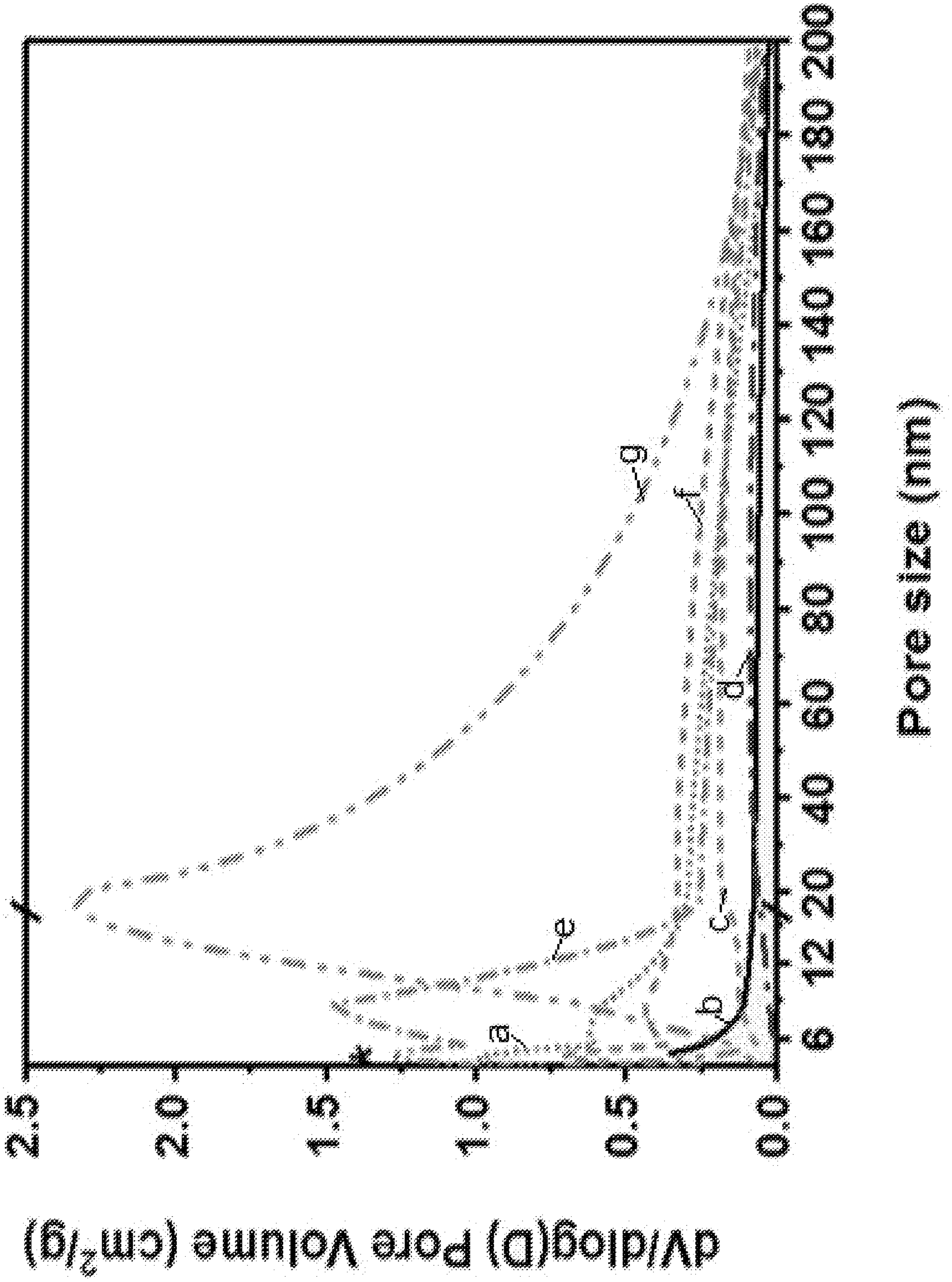

FIG. 12 shows the pore size distributions of (a) the LDH of Example 1.1; (b) the LDH of Example 3.1; (c) the LDH of Example 1.2; (d) the LDH of Example 3.2; (e) the LDH of Example 2.1; (f) the LDH of Example 1.1 aged for 3 days; and (g) the LDH of Example 2.2 (*=tensile strength effect).

Figure 13:
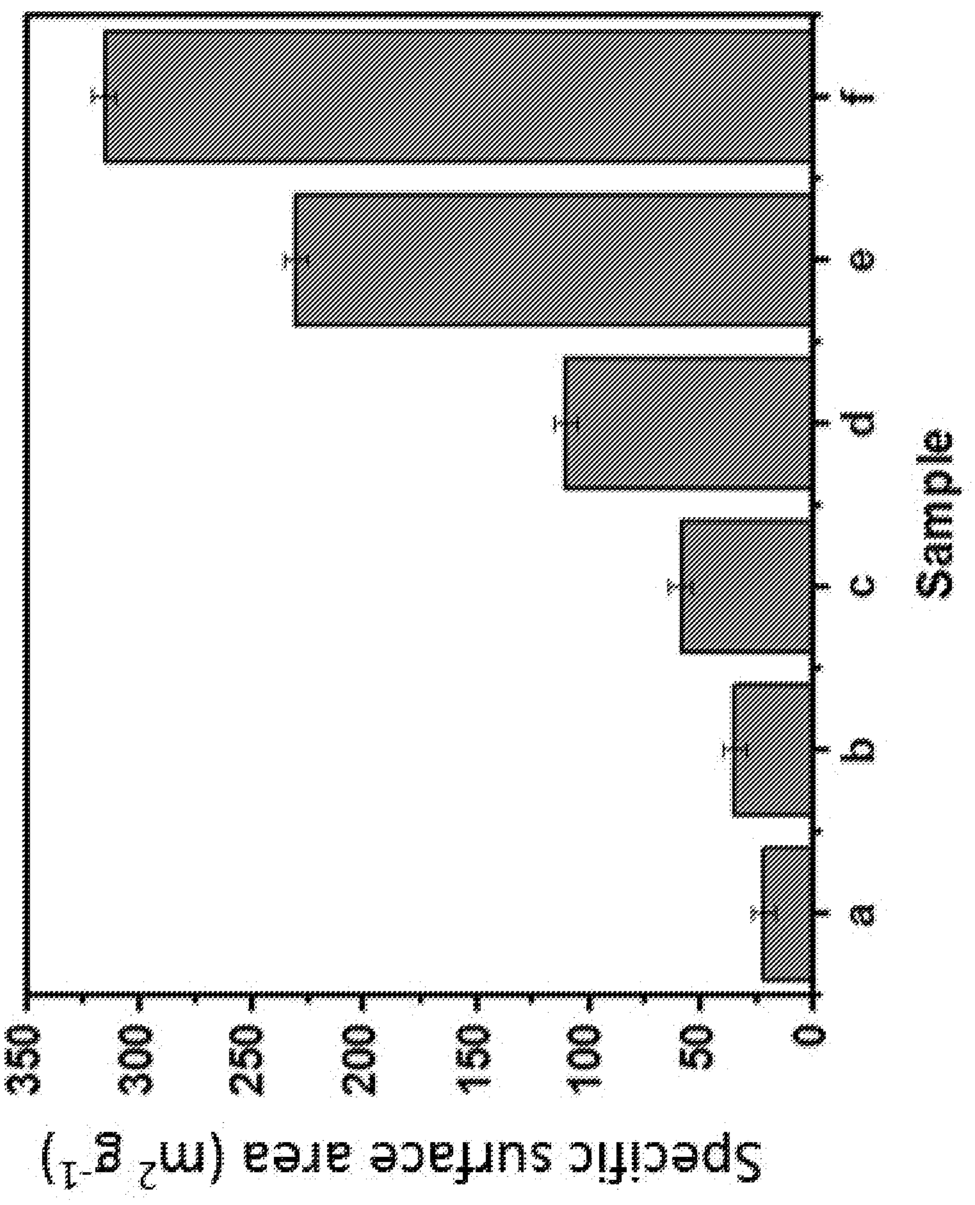

FIG. 13 shows the BET specific surface areas of (a) the LDH of Example 3.2; (b) the LDH of Example 3.1; (c) the LDH of Example 1.2; (d) the LDH of Example 1.1; (e) the LDH of Example 2.1; and (f) the LDH of Example 2.2.

Figure 14:
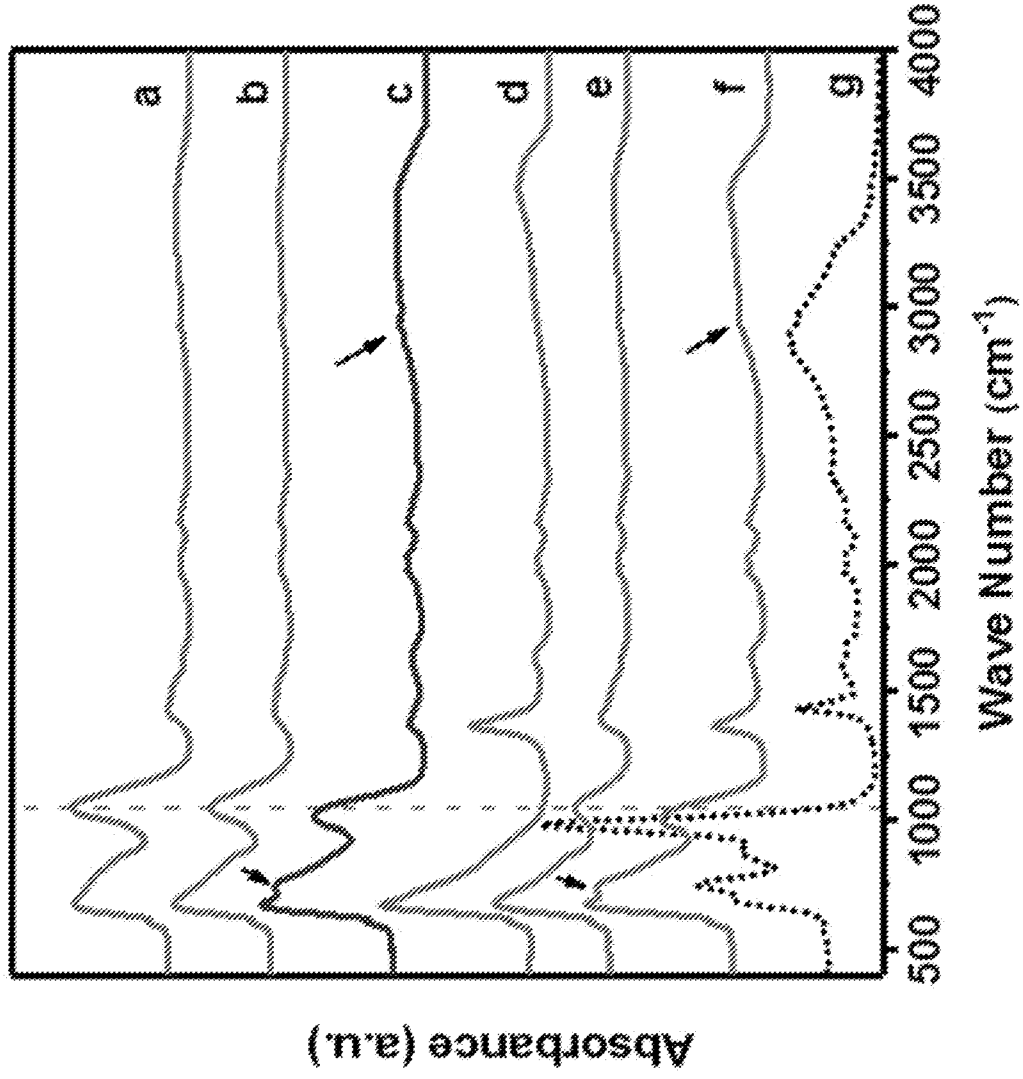

FIG. 14 shows FTIR spectra of (a) the LDH of Example 3.2; (b) the LDH of Example 1.2 after 5 days ageing; (c) the LDH of Example 1.2 after 3 days ageing; (d) the LDH of Example 3.1; (e) the LDH of Example 1.1 after 5 days ageing; (f) the LDH of Example 1.1 after 3 days ageing; and (g) struvite.

Figure 15:
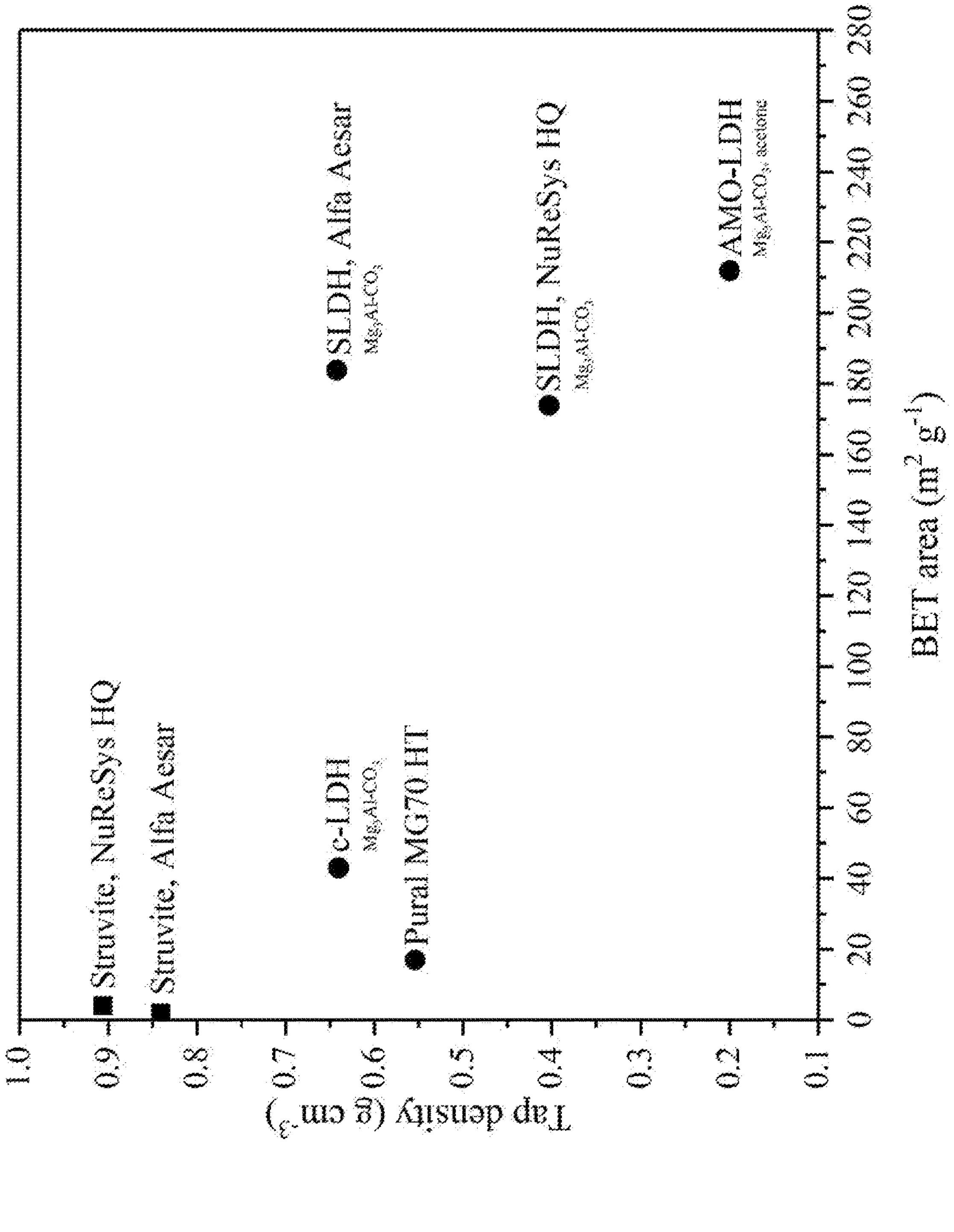

FIG. 15 shows the tap density and BET surface area of various materials: S-LDHs were prepared according to the procedure outlined in Example 2.4; c-LDH was prepared according to the procedure outlined in Example 3.1; AMO-LDH was prepared according to the procedure outlined in Example 3.3; Pural MG70 HT is a commercially available Mg—Al—$CO_3$ LDH.

Figure 16:
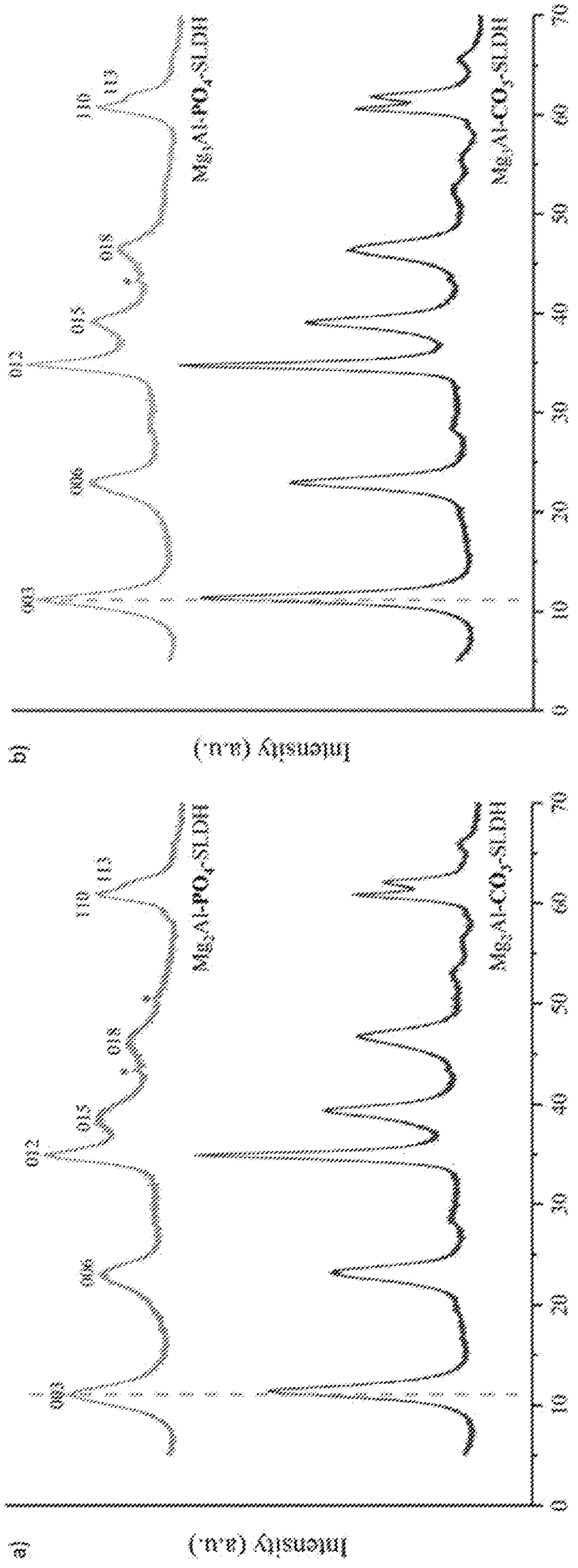

FIG. 16 shows XRD patterns of carbonate SLDH of Example 2.4 and phosphate SLDH of Example 2.5: a) Mg/Al=2 and b) Mg/Al=3. *Reflections due to the sample holder.

Figure 17:
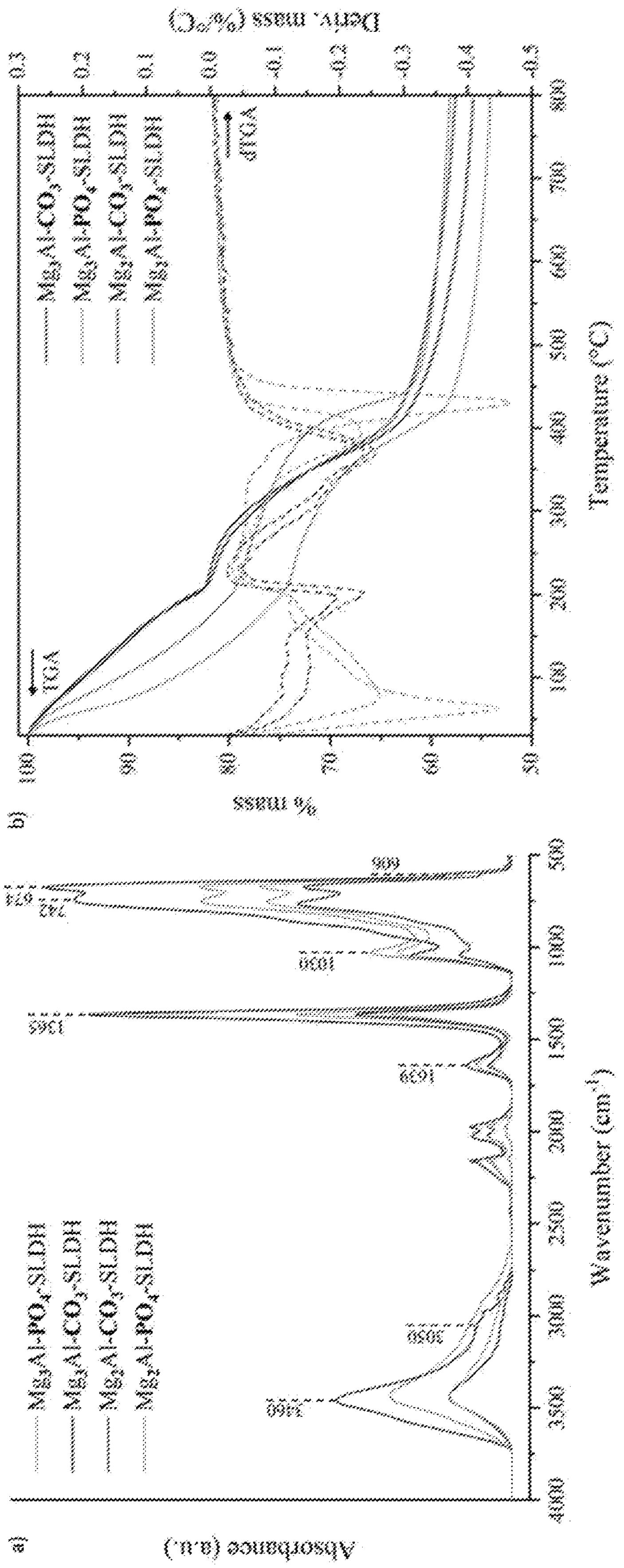

FIG. 17 shows a) FTIR spectra and b) thermal analyses of carbonate SLDH of Example 2.4 and phosphate SLDH of Example 2.5.

Figure 18:
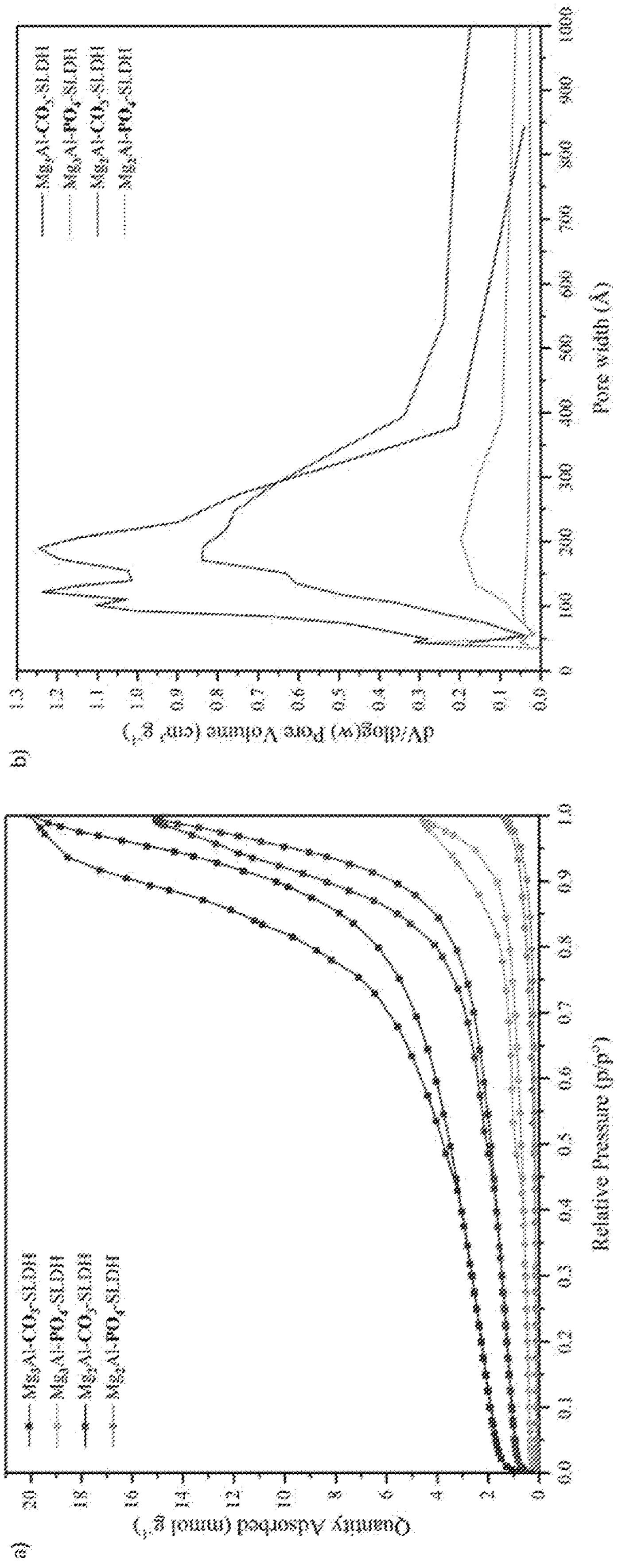

FIG. 18 shows a) $N_2$ adsorption and desorption isotherms and b) BJH desorption pore size distributions of carbonate SLDH of Example 2.4 and phosphate SLDH of Example 2.5.

Figure 19:
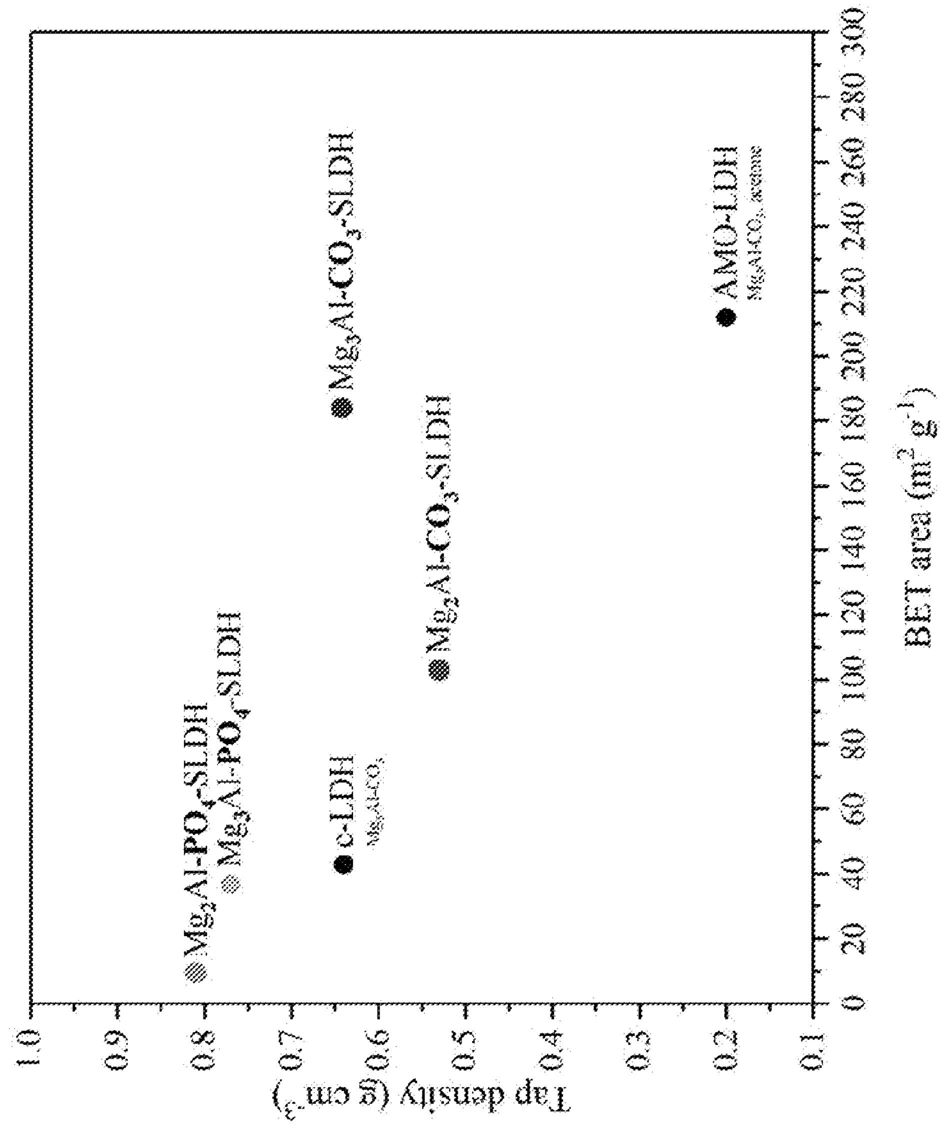

FIG. 19 shows BET area and tap density comparison of carbonate SLDHs of Example 2.4 and phosphate SLDHs of Example 2.5, as well as conventional LDH of Example 3.1 and AMO-LDH of Example 3.3.

Figure 20:
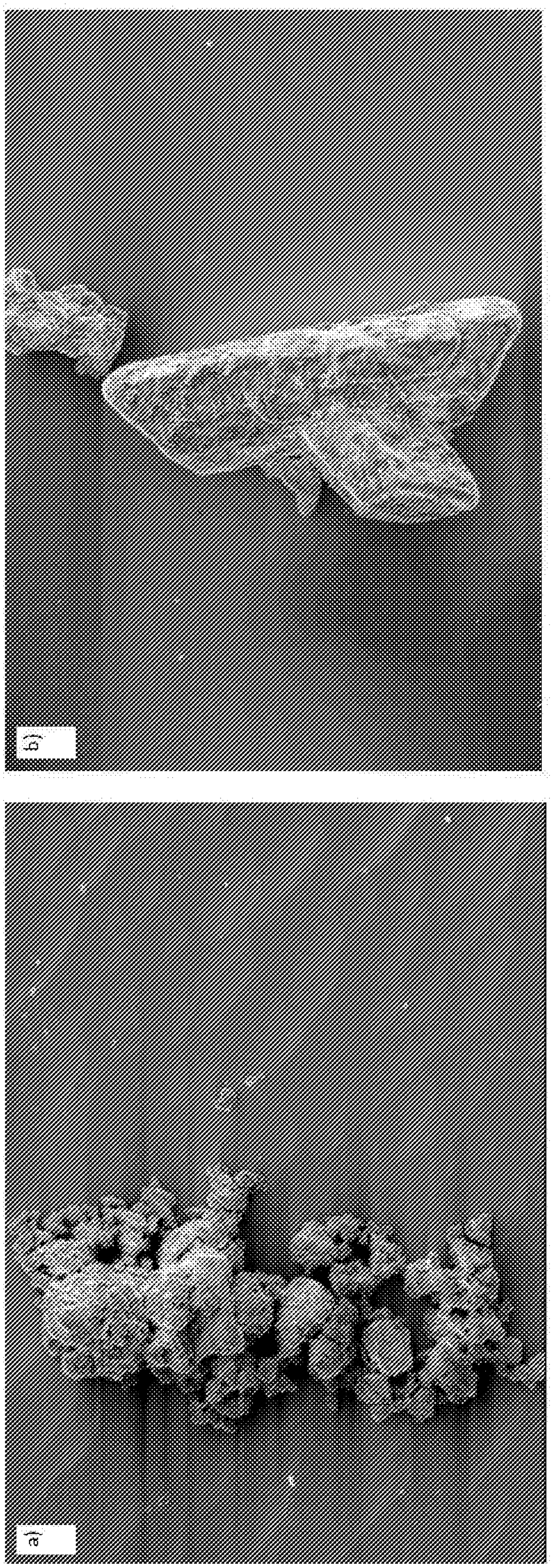

FIG. 20 shows SEM images of a) carbonate SLDHs of Example 2.4 and b) phosphate SLDH of Example 2.5. Mg/Al=2.

Figure 21:
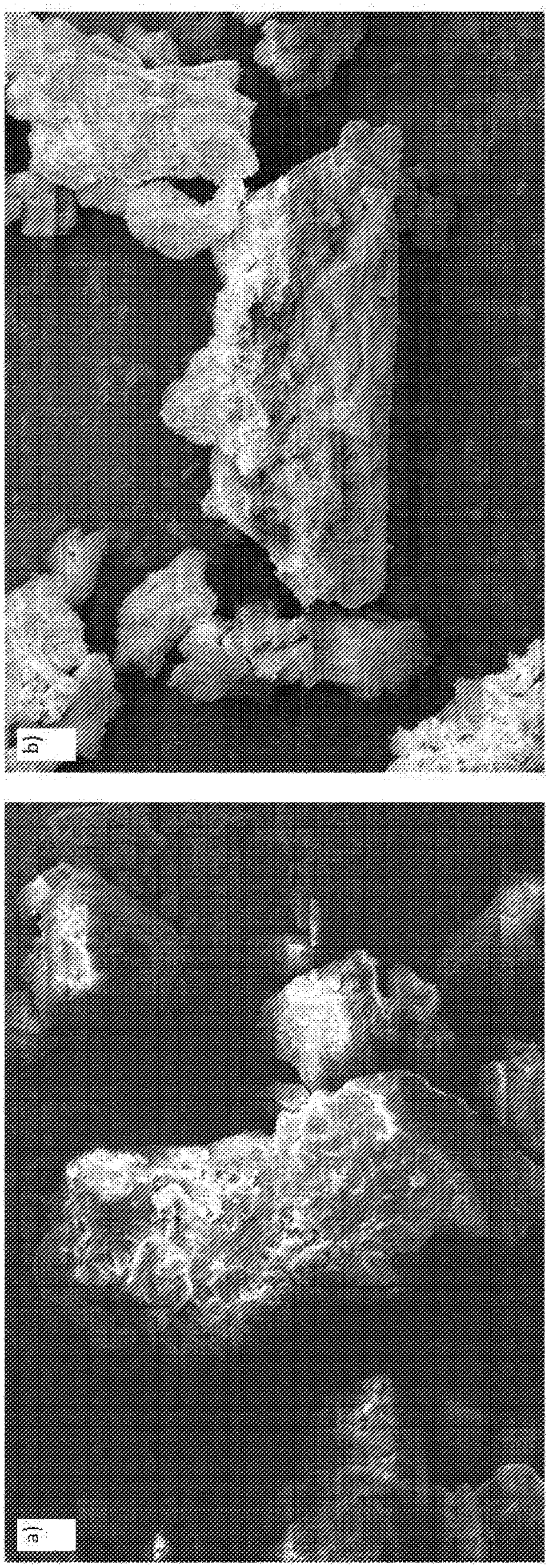

FIG. 21 shows SEM images of a) carbonate SLDHs of Example 2.4 and b) phosphate SLDH of Example 2.5. Mg/Al=3.

Figure 22:
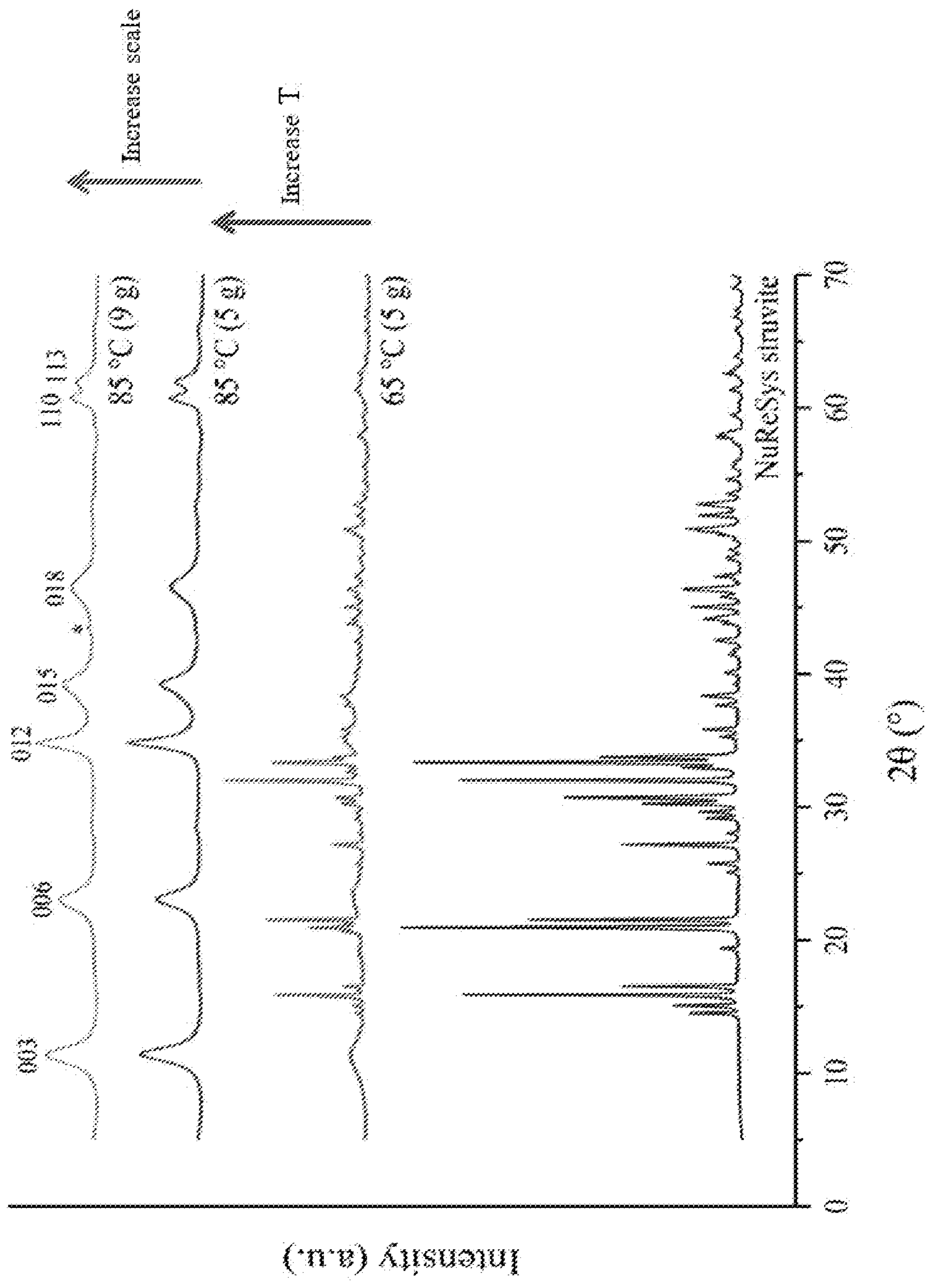

FIG. 22 shows XRD diffractograms of NuReSys struvite, as well as the SLDHs of Examples 2.3 and 2.4. Mg/Al=3.

Figure 23:
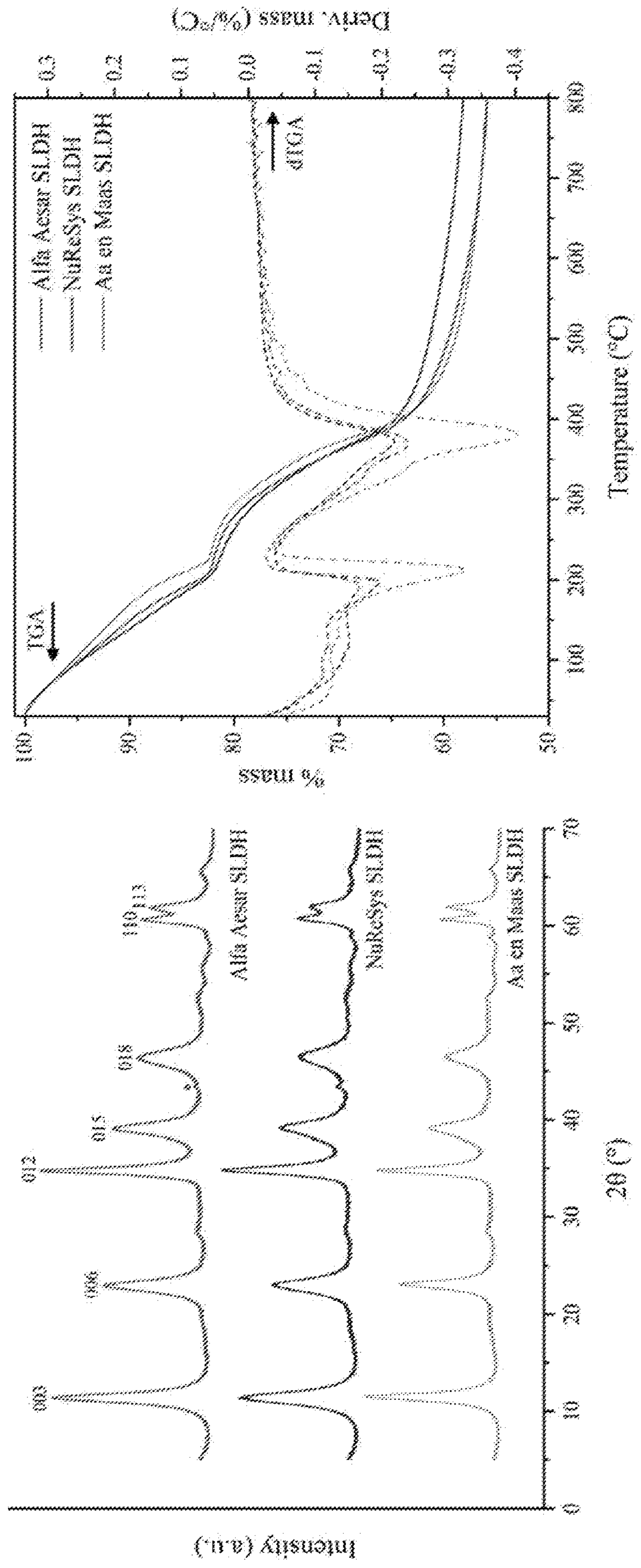

FIG. 23 shows a) XRD diffractograms and b) TGA and dTGA plots of Example 2.4 SLDHs prepared from Alfa Aesar, NuReSys and Aa en Maas. Mg/Al=3. *Reflection due to the sample holder.

Figure 24:
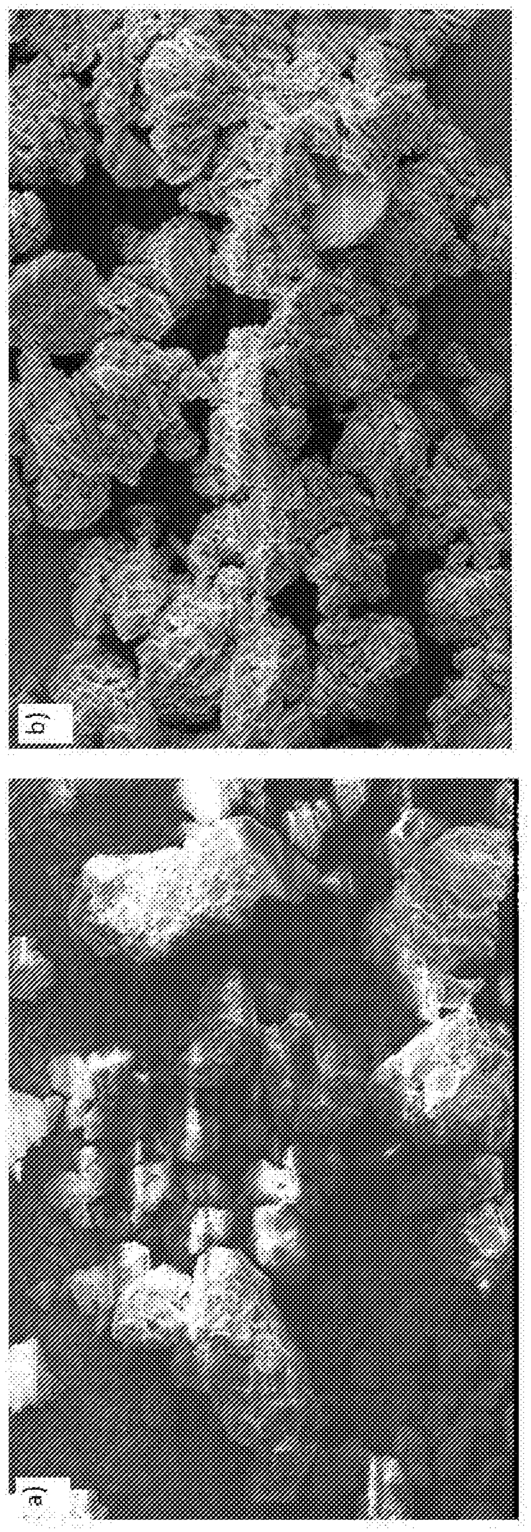

FIG. 24 shows SEM images of a) Alfa Aesar, b) NuReSys and c) Aa en Maas Example 2.4 SLDHs. Mg/Al=3.

Figure 25:
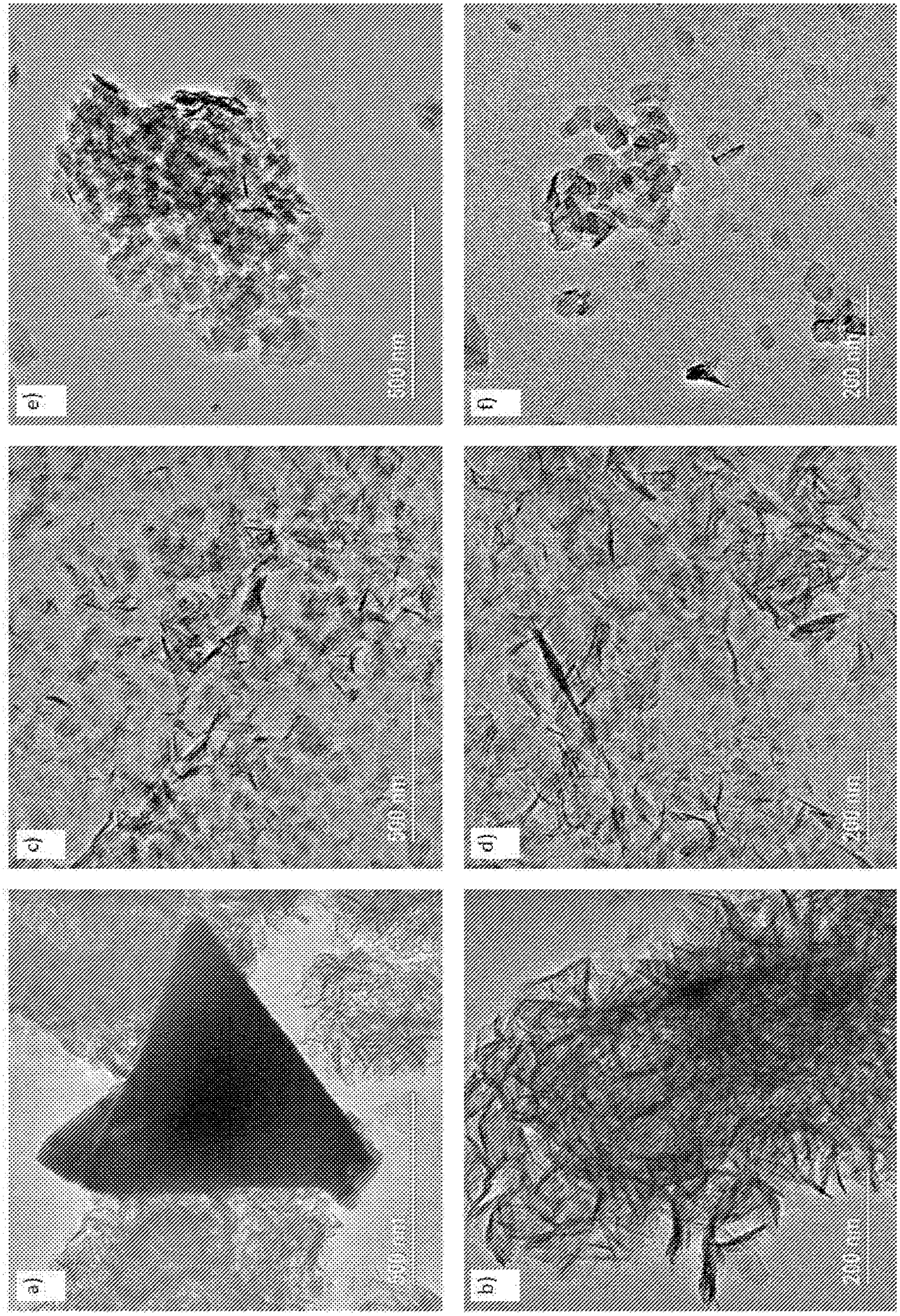

FIG. 25 shows TEM images of Alfa Aesar (a and b), NuReSys (c and d) and Aa en Maas (e and f) Example 2.4 SLDHs. Mg/Al=3.

Figure 26:
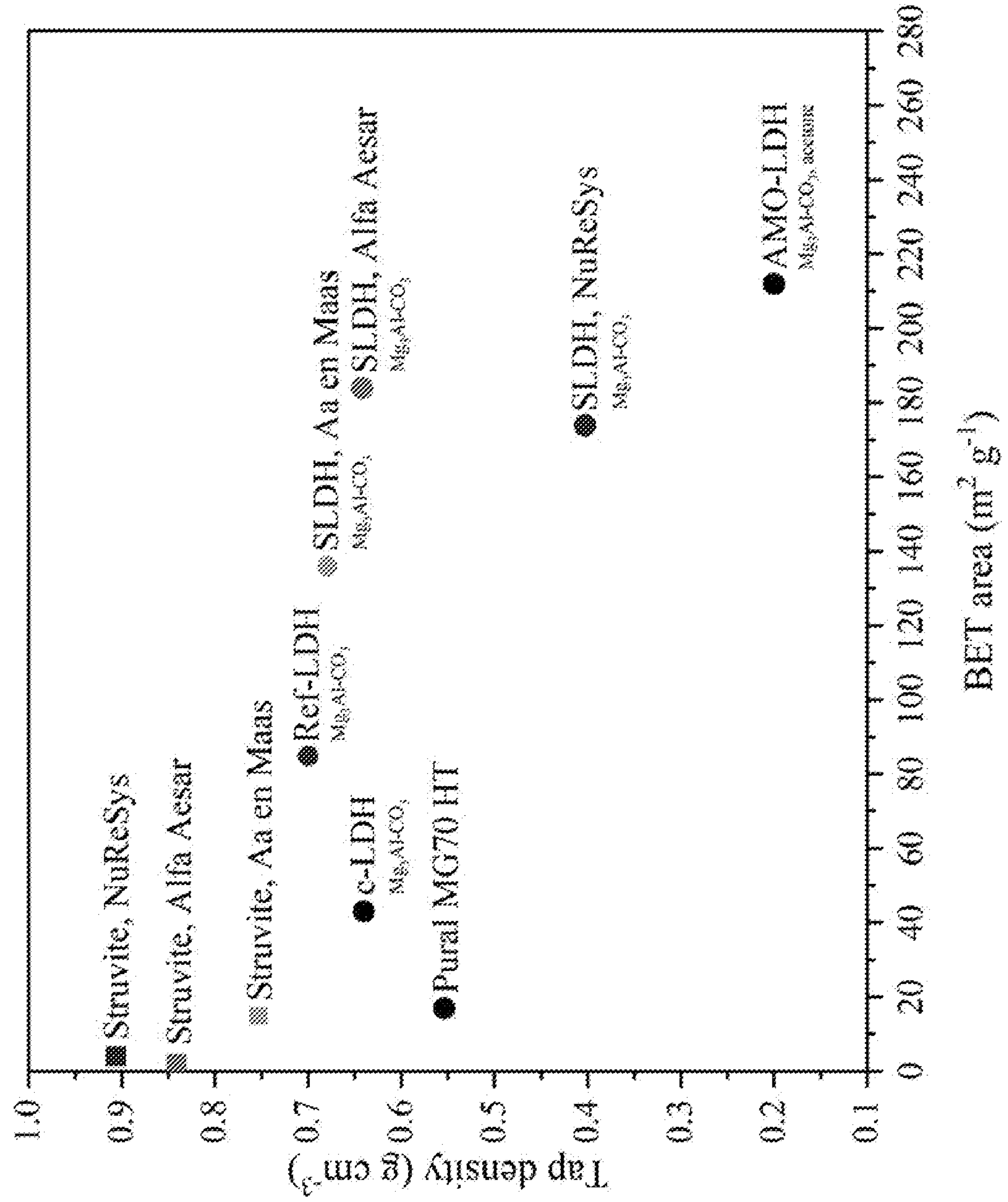

FIG. 26 shows tap density plotted as a function of BET area for struvite, various Example 2.4 SLDHs, the conventional LDH (c-LDH) of Example 3.1, the AMO-LDH of Example 3.3, a commercially-available LDH (Pural MG70 HT) and a reference LDH (Ref-LDH) prepared by an identical procedure to that described in Example 2.4, except that magnesium nitrate was used as the source of $Mg^{2+}$ instead of struvite.

Figure 27:
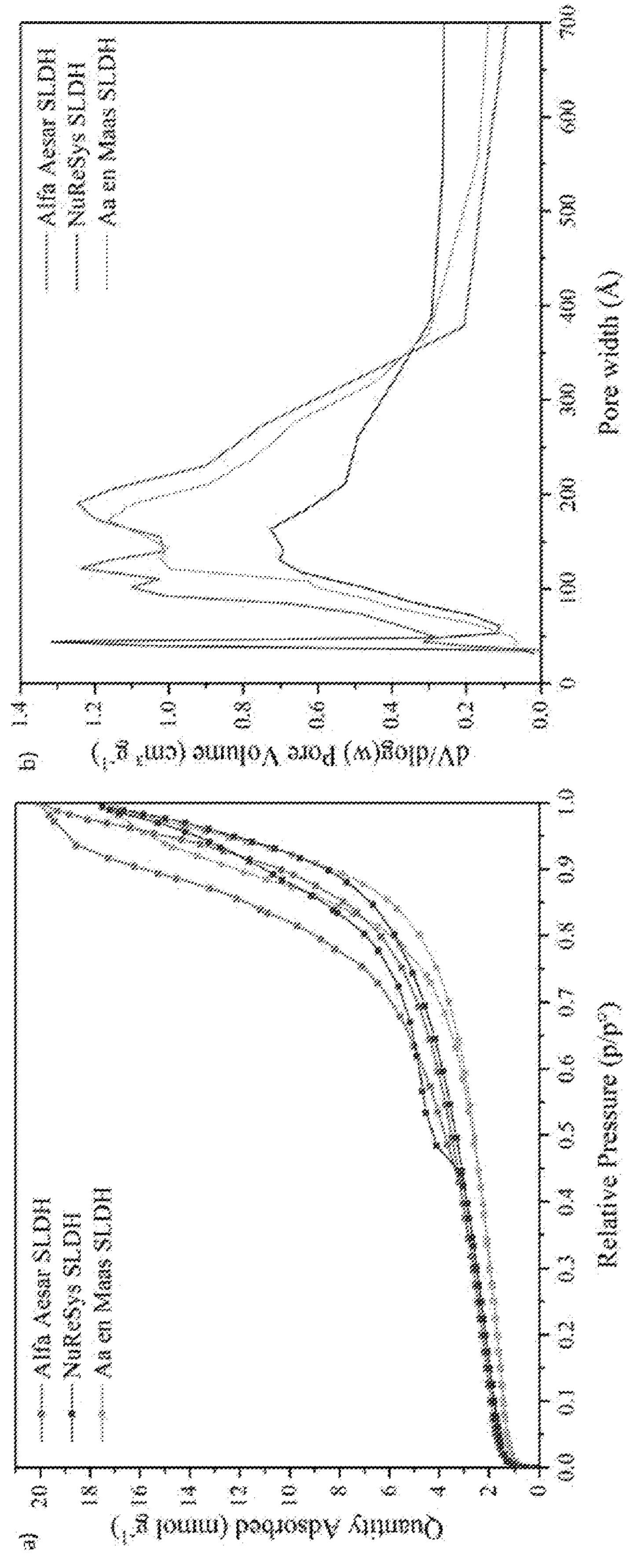

FIG. 27 shows a) $N_2$ adsorption and desorption isotherms and b) BJH pore size distributions of Example 2.4 SLDHs. Mg/Al=3.

Figure 28:
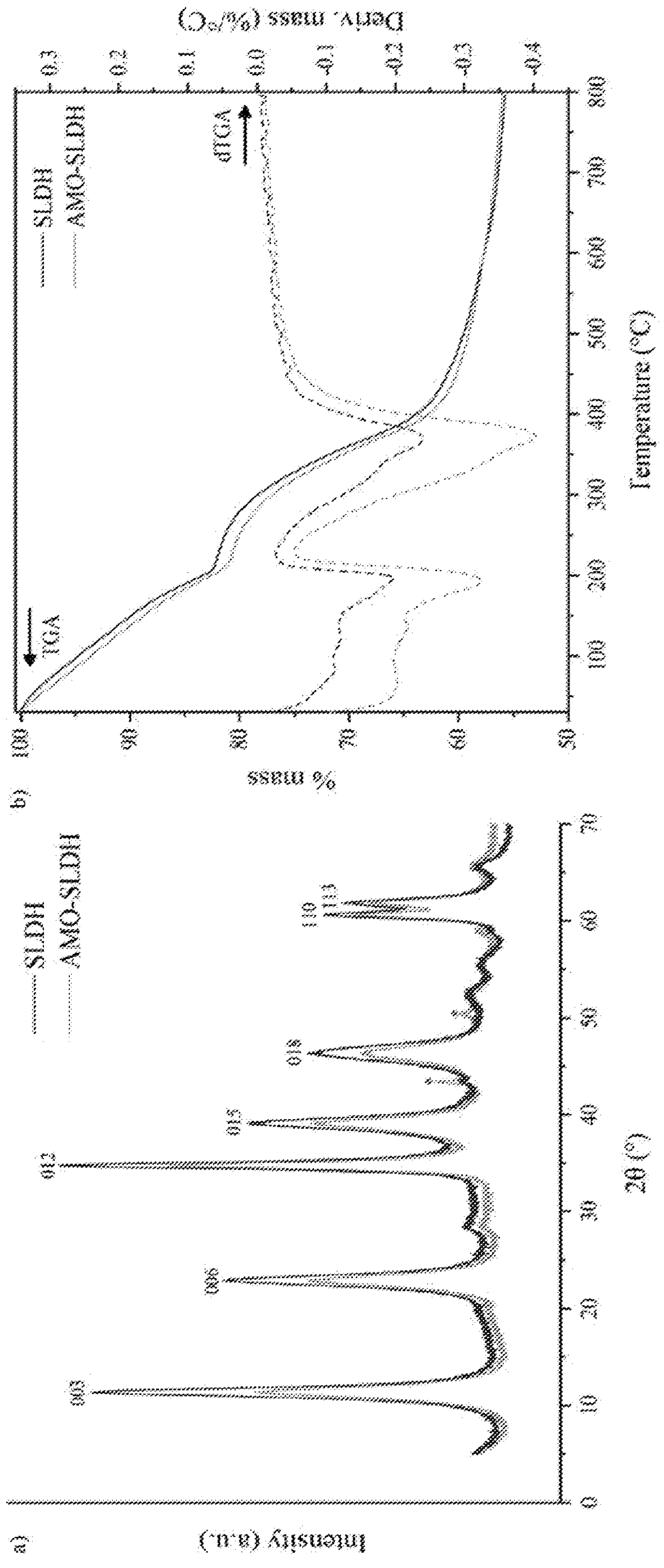

FIG. 28 shows a) Powder XRD diffractograms and b) TGA and dTGA plots of Example 2.4 SLDH and Example 2.6 AMO-SLDH. Mg/Al=3. *peaks due to the sample holder.

Figure 29:
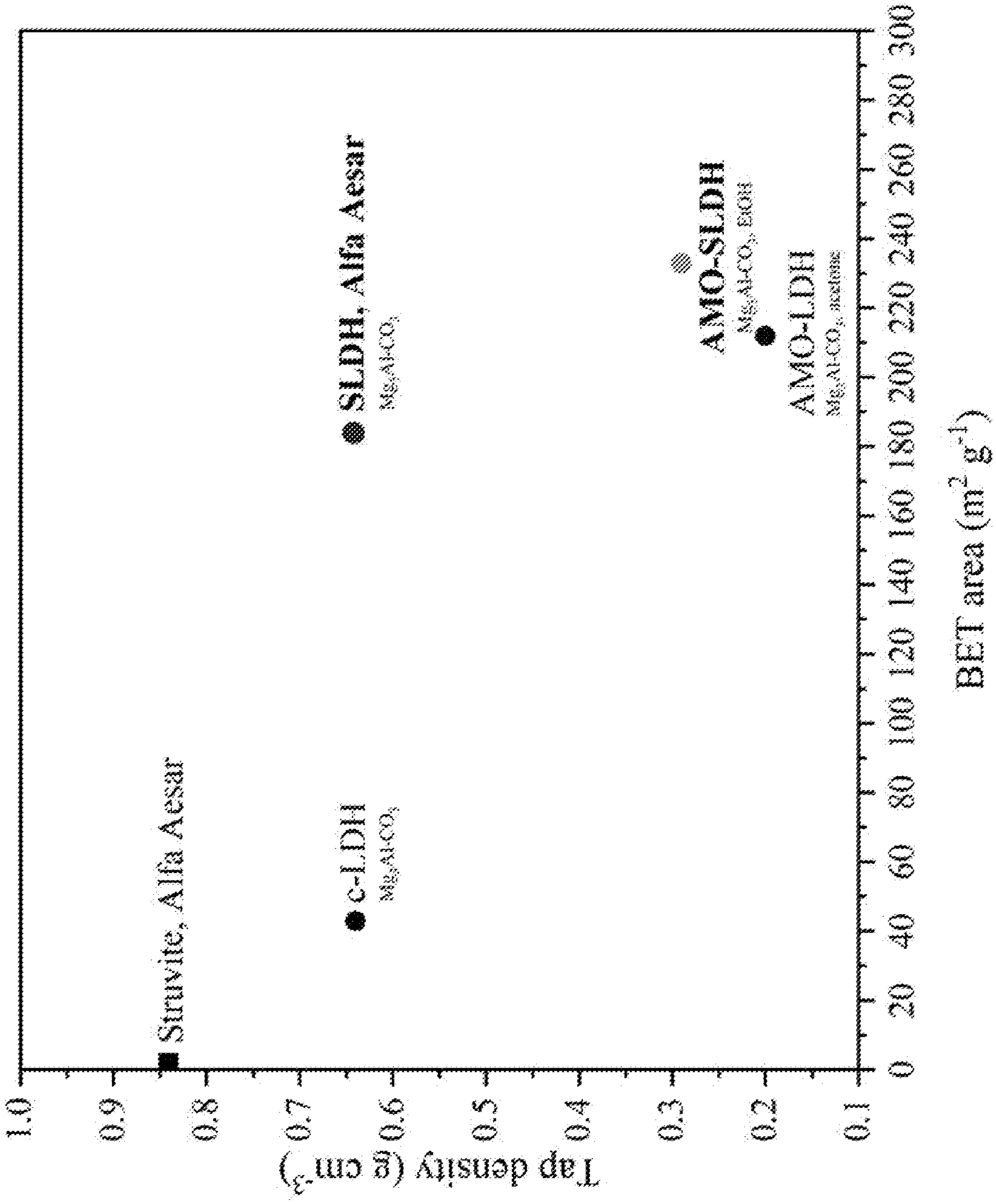

FIG. 29 shows tap density plotted as a function of BET specific surface area for struvite, SLDH of Example 2.4, conventional LDH of Example 3.1, AMO-LDH of Example 3.3 and AMO-SLDH of Example 2.6. Mg/Al=3.

Figure 30:
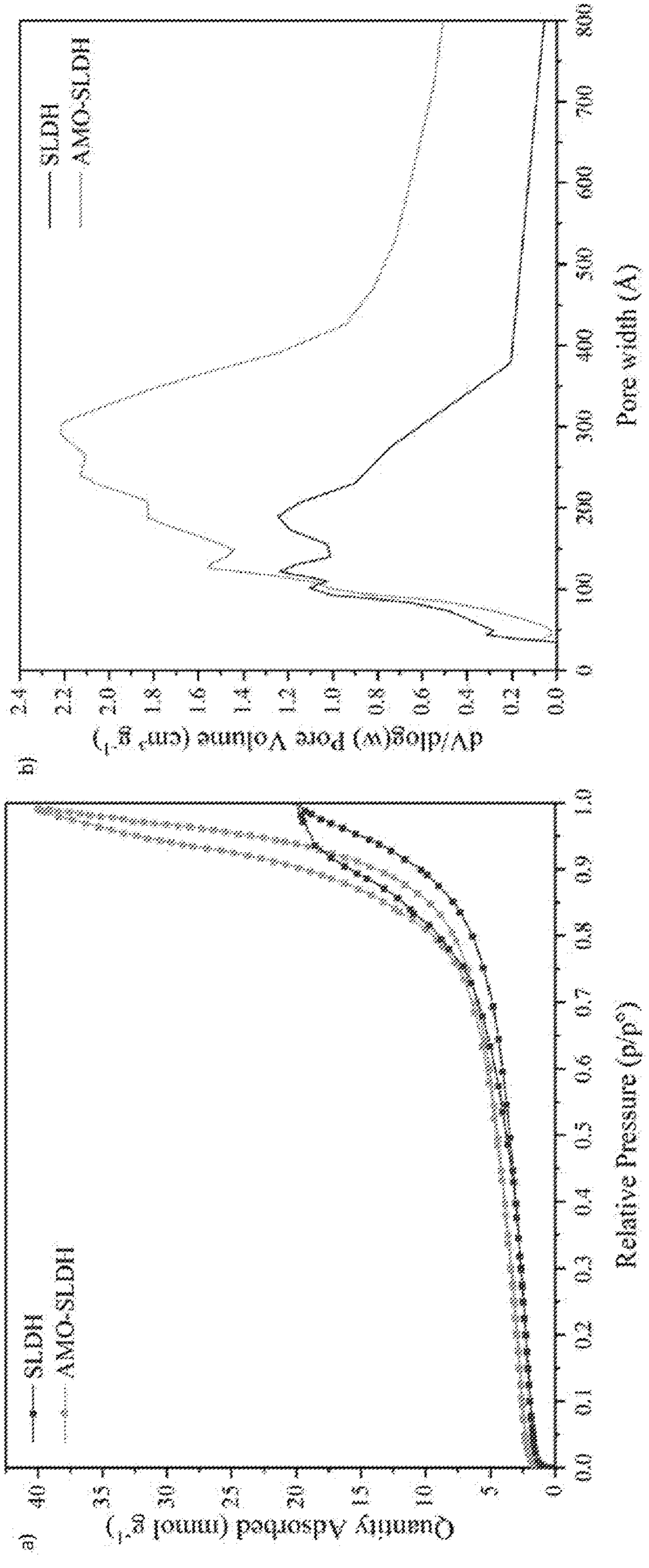

FIG. 30 shows a) $N_2$ adsorption and desorption isotherms and b) BJH pore size distributions of Example 2.4 SLDH and Example 2.6 AMO-SLDH. Mg/Al=3.

Figure 31:
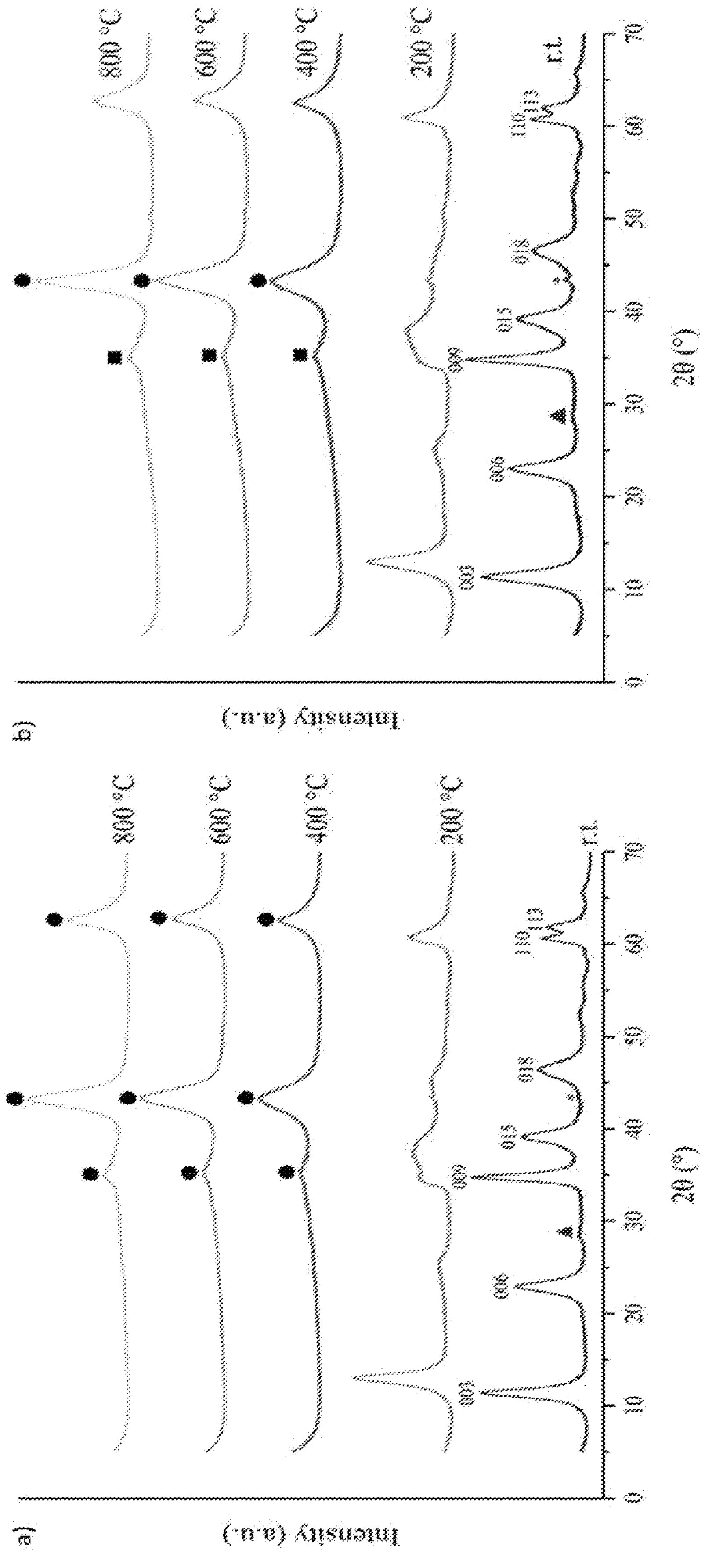

FIG. 31 shows XRD diffractograms of Example 2.4 SLDH ("r.t") and SLDOs prepared from Example 2.4 SLDH at different temperatures using a) Alfa Aesar and b) NuReSys struvite. Mg/Al=3. *peak due to the sample holder. ▲$Al(OH)_3$. ■$Al_2O_3$. •MgO.

Figure 32:
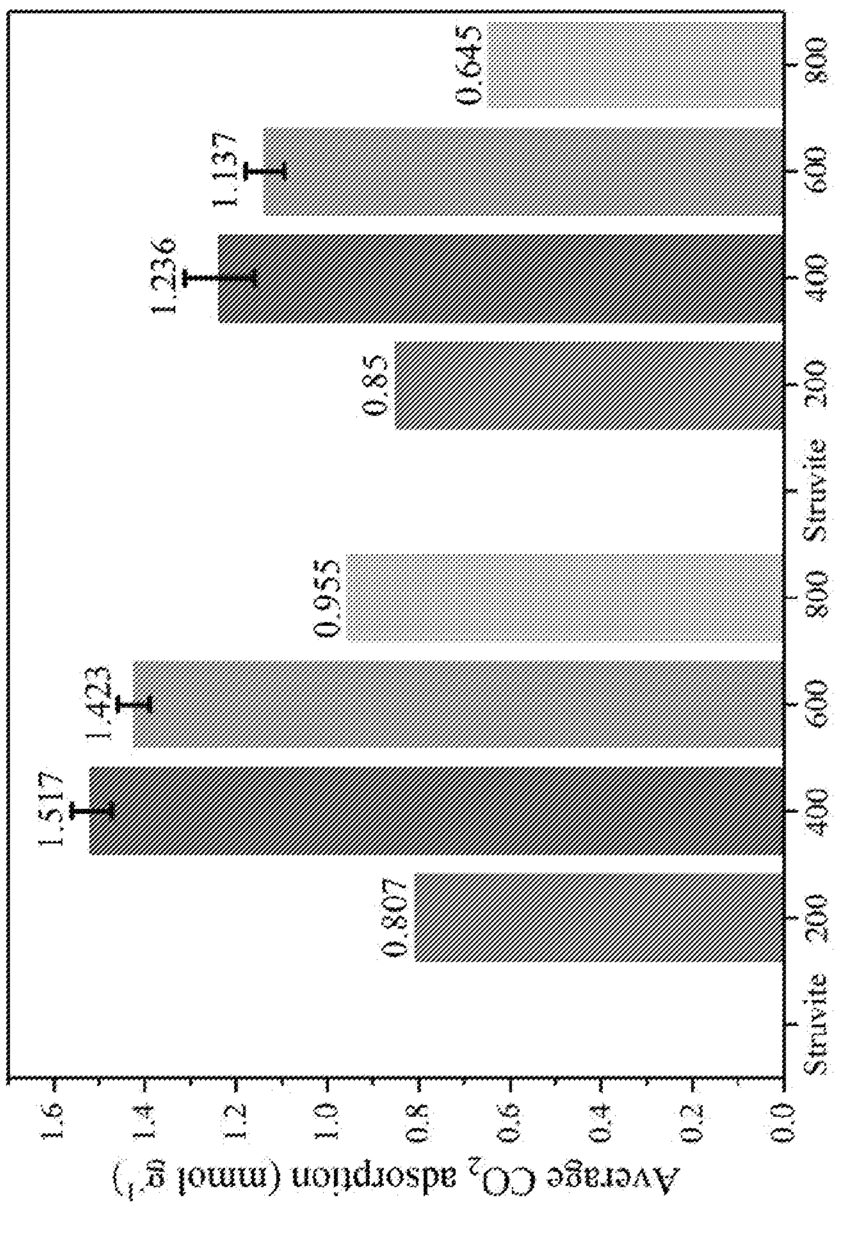

FIG. 32 shows average $CO_2$ adsorption by struvite and SLDOs prepared from Example 2.4 SLDHs at different temperatures. The Example 2.4 SLDHs were calcined in situ (ramp rate 5° C. $min^{-1}$, hold 2 h, 100 $cm^3$ $min^{-1}$ $N_2$) and adsorption was measured at 30° C. (100 $cm^3$ $min^{-1}$ 20:80 $CO_2$:$N_2$).

Figure 33:
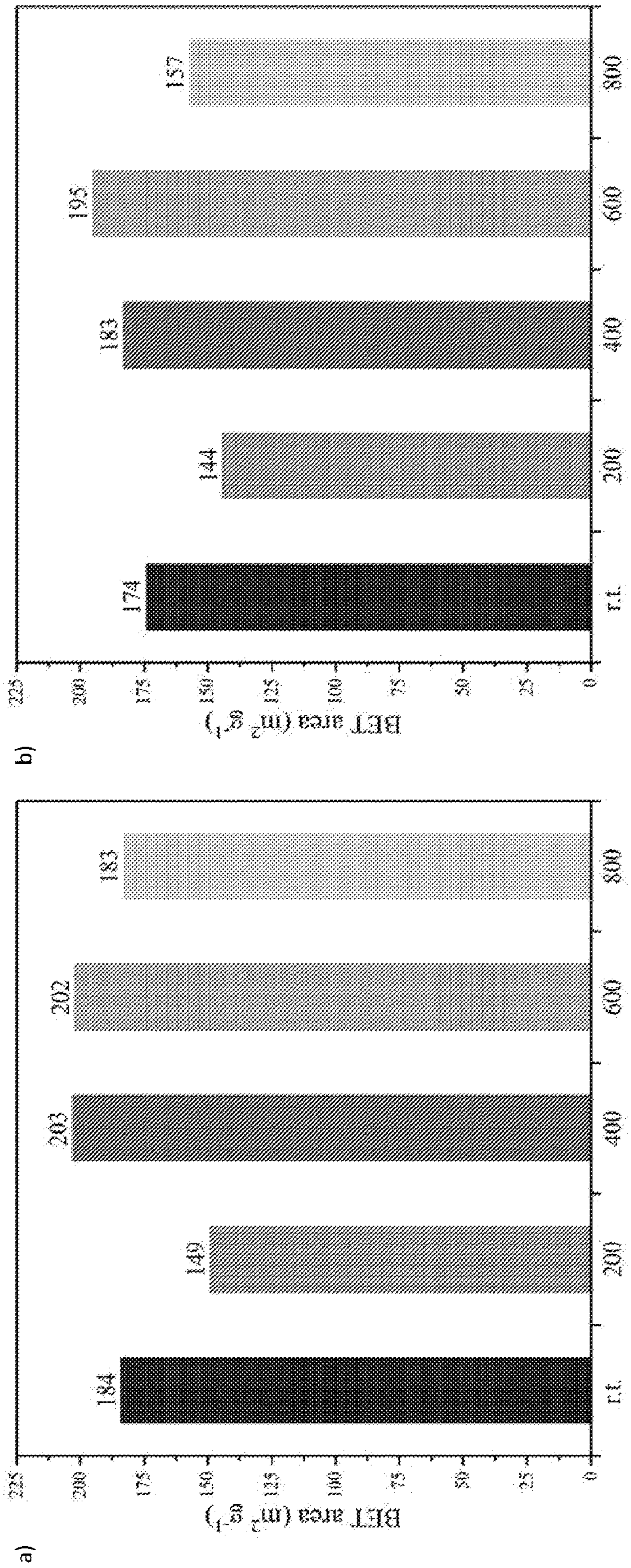

FIG. 33 shows BET surface areas of Example 2.4 SLDH ("r.t") and SLDOs prepared from Example 2.4 SLDH at different temperatures using a) Alfa Aesar and b) NuReSys struvite. Mg/Al=3.

Figure 34:
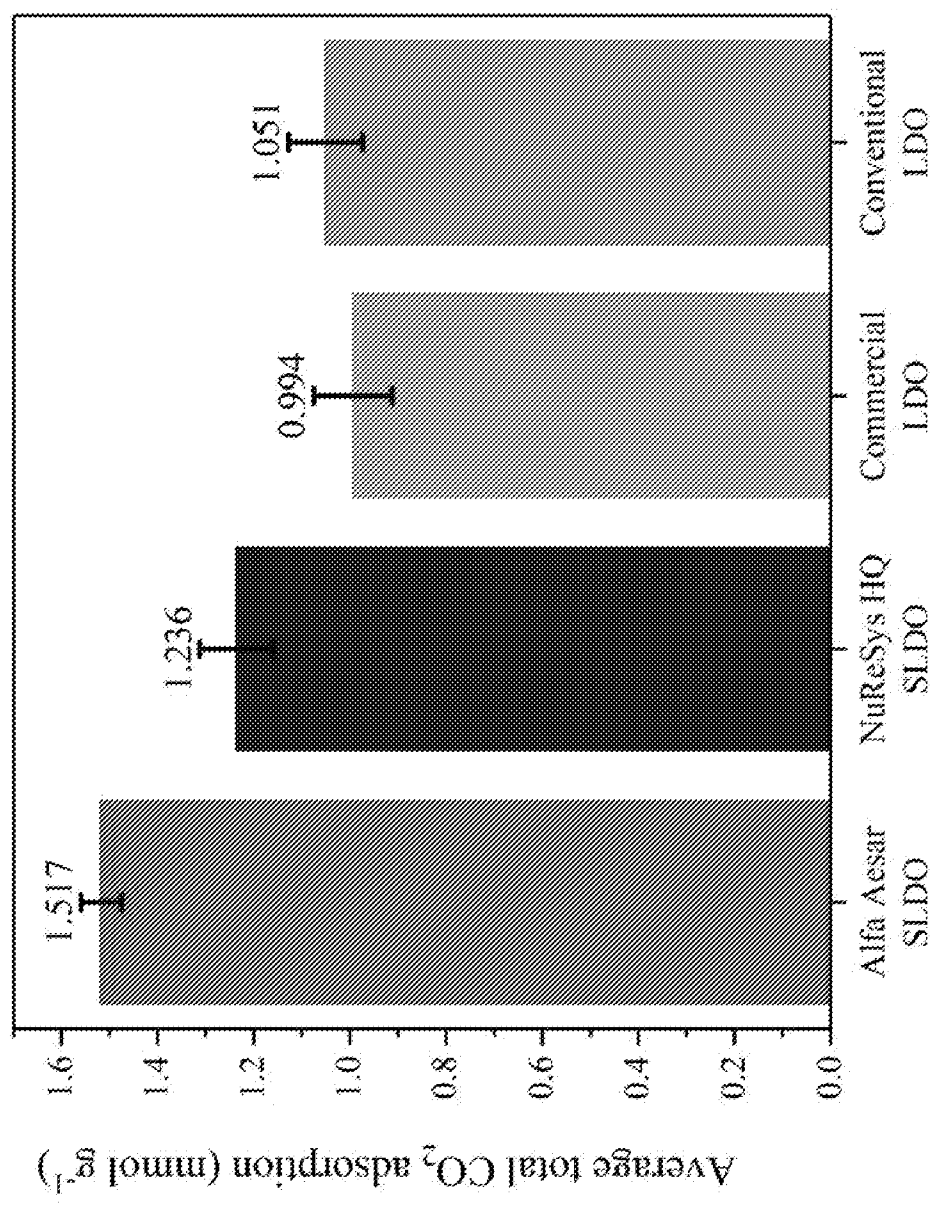

FIG. 34 shows a comparison of $CO_2$ adsorption capacities of SLDOs prepared from Example 2.4 SLDHs, LDO prepared from commercially available Pural MG70 HT and LDO prepared from the conventional LDH of Example 3.1. LDOs were all prepared at 400° C. (ramp rate 5° C. $min^{-1}$, hold 2 h, 100 $cm^3$ $min^{-1}$ $N_2$) and adsorption was measured at 30° C. (100 $cm^3$ $min^{-1}$ 20:80 $CO_2$:$N_2$).

MATERIALS

Unless otherwise indicated, all reagents were purchased commercially and used as supplied.

Struvite obtained from Aarhus Vand Waste Water Treatment Plant in Denmark was. grey in colour, with a crystal-like morphology and a 2 mm particle size. Prior to use, the particle size of the struvite was reduced to between 5 μm and 100 μm by 2×1 min high speed grinding in a standard coffee grinder, to produce the struvite powder used in the examples.

Struvite obtained from Alfa Aesar (98% ammonium magnesium phosphate), a white crystalline material, was used as received.

Struvite obtained from NuReSys (BioStru fertiliser granules) was in the form of off-white (beige) granules having an approximate diameter of 0.5-2.0 mm. They were used as received.

PART A

Preparation of LDHs

Example 1—Preparation of LDHs From Struvite

1.1 $MgAlCO_3$ LDH-35° C. Struvite Dissolution; 35° C. Ageing

To a 500 mL 3-necked flask was charged struvite powder (Aarhus Vand, 5.5 g) and deionised water (200 mL). The mixture was stirred (1000 rpm) at 35° C. for one hour. $Na_2CO_3$ (3.06 g) was added to the mixture and it was stirred for a further 30 mins. A solution of $Al(NO_3)_3.9H_2O$ (2.7 g) in deionised water (200 mL) was then added dropwise at a rate of 2 mL/min, keeping the batch temperature at 35° C. and the pH at 11.5 by addition of 1 M NaOH. The mixture was stirred at 35° C. for 5 days to age the slurry. The slurry was filtered, the filter cake was washed with deionised water until the washings were pH 7 and the solid was dried in a vacuum oven at 30° C. overnight to yield a white powder (2.8-3.2 g).

1.2 $MgAlPO_4$LDH-35° C. Struvite Dissolution; 35° C. Ageing

To a 500 mL 3-necked flask was charged struvite powder (Aarhus Vand, 5.5 g) and degassed water (200 mL) under nitrogen atmosphere. 1M NaOH was added to adjust the pH to 11.5 and the mixture was stirred (1000 rpm) at 35° C. for 30 mins. A solution of $Al(NO_3)_3$. $9H_2O$ (2.7 g) in degassed water (200 mL) was then added dropwise at a rate of 2 mL/min, keeping the batch temperature at 35° C. and the pH at 11.5 by addition of 1 M NaOH. The mixture was stirred at 35° C. for 5 days. The slurry was filtered, the filter cake was washed with deionised water until the washings were pH 7 and the solid was dried in a vacuum oven at 30° C. overnight to yield a white powder (2.8-3.2 g).

The struvite starting material and Examples 1.1 and 1.2 had the following compositions as determined by ICP-MS:

| | Struvite | Example 1.1 | Example 1.2 | D.L.(wt. %) |
|---|---|---|---|---|
| Mg/Al | — | 2.74 | 2.78 | — |
| P. (wt. %) | 12.5% | 3.28% | 5.58% | 0.0001 |
| Cr (wt. %) | B.D.L. | B.D.L. | B.D.L. | 0.00001 |
| Ni (wt. %) | B.D.L. | B.D.L. | B.D.L. | 0.00001 |
| Cu (wt. %) | 0.00006% | B.D.L. | B.D.L. | 0.00002 |
| Zn (wt. %) | 0.00026% | 0.0024% | 0.026% | 0.00005 |
| As (wt. %) | 0.00006% | B.D.L. | B.D.L. | 0.00004 |
| Cd (wt. %) | B.D.L. | B.D.L. | B.D.L. | 0.000002 |
| Mg (wt. %) | B.D.L. | B.D.L. | B.D.L. | 0.00001 |
| Pb (wt. %) | B.D.L. | B.D.L. | B.D.L. | 0.00002 |

1.3 $MgAlCO_3$LDH-55° C. Struvite Dissolution; 55° C. Ageing

To a 250 mL 3-necked flask was charged struvite powder (Alfa Aesar, 2.76 g) and deionised water (20 mL). The mixture was stirred (1000 rpm) at 55° C. for 30 mins under a flow of nitrogen. The ammonia off-gases were collected via a trap containing 1M HCl. $Na_2CO_3$ (1.59 g) was added to the mixture and it was stirred for a further 30 mins. A solution of $Al(NO_3)_3.9H_2O$ (1.41 g) in deionised water (20 mL) was then added dropwise at a rate of 2 mL/min, keeping the batch temperature at 55° C. and the pH at 11.5 by addition of 1 M NaOH. The mixture was stirred at 55° C. for 2, 4, 8 or 24 hours to age the slurry. The slurry was filtered, the filter cake was washed with deionised water until the washings were pH 7 and the solid was dried in a vacuum oven at 30° C. overnight to yield a white powder.

1.4 $MgAlCO_3$LDH-75° C. Struvite Dissolution; 75° C. Ageing

To a 250 mL 3-necked flask was charged struvite powder (Alfa Aesar, 2.76 g) and deionised water (20 mL). The mixture was stirred (1000 rpm) at 75° C. for 30 mins under a flow of nitrogen. The ammonia off-gases were collected via a trap containing 1M HCl. $Na_2CO_3$ (1.59 g) was added to the mixture and it was stirred for a further 30 mins. A solution of $Al(NO_3)_3.9H_2O$ (1.41 g) in deionised water (20 mL) was then added dropwise at a rate of 2 mL/min, keeping the batch temperature at 75° C. and the pH at 11.5 by addition of 1 M NaOH. The mixture was stirred at 75° C. for 2, 4 or 8 hours to age the slurry. The slurry was filtered, the filter cake was washed with deionised water until the washings were pH 7 and the solid was dried in a vacuum oven at 30° C. overnight to yield a white powder.

Example 2—Preparation of LDHs From Struvite

2.1 $MgAlCO_3$LDH-65° C. Struvite Decomposition; 35° C. Ageing

To a 500 mL 3-necked flask was charged struvite powder (Aarhus Vand, 5.5 g) and 1 M NaOH (20 mL). The mixture was stirred (1000 rpm) at 65° C. for 2 hours under a flow of nitrogen. The ammonia off-gases were collected via a trap containing 1M HCl. $Na_2CO_3$ (3.06 g) was added to the mixture and it was stirred for a further 5 mins. A solution of $Al(NO_3)_3.9H_2O$ (2.7 g) in deionised water (200 mL) was then added dropwise at a rate of 2 mL/min, keeping the batch temperature at 65° C. and the pH at 11.5 by addition of 1 M NaOH. The mixture was then stirred at 35° C. for 2 days. The slurry was filtered, the filter cake was washed with deionised water until the washings were pH 7 and the solid was dried in a vacuum oven at 30° C. overnight to yield a white powder (2.8-3.2 g).

2.2 $MgAlCO_3$LDH-85° C. Struvite Decomposition; 35° C. Ageing

To a 500 mL 3-necked flask was charged struvite powder (Aarhus Vand, 5.5 g) and 1 M NaOH (20 mL). The mixture was stirred (1000 rpm) at 85° C. for 2 hours under a flow of nitrogen. The ammonia off-gases were collected via a trap containing 1M HCl. $Na_2CO_3$ (3.06 g) was added to the mixture and it was stirred for a further 5 mins. A solution of $Al(NO_3)_3$.9H20 (2.7 g) in deionised water (200 mL) was then added dropwise at a rate of 2 mL/min, keeping the batch temperature at 85° C. and the pH at 11.5 by addition of 1 M NaOH. The mixture was then stirred at 35° C. for 2 days. The slurry was filtered, the filter cake was washed with deionised water until the washings were pH 7 and the solid was dried in a vacuum oven at 30° C. overnight to yield a white powder (2.8-3.2 g).

2.3 $MgAlCO_3$LDH-65° C. Struvite Decomposition; 65° C. Ageing

To a 250 mL 3-necked flask was charged struvite powder (Alfa Aesar/NuReSys, 2.76 g) and 1 M NaOH (10 mL). The mixture was stirred (1000 rpm) at 65° C. for 1 hour under a flow of nitrogen. The ammonia off-gases were collected via a trap containing 1M HCl. $Na_2CO_3$ (1.59 g) was added to the mixture and it was stirred for a further 5 mins. A solution of $Al(NO_3)_3.9H_2O$ (1.41 g) in deionised water (20 mL) was then added dropwise at a rate of 2 mL/min, keeping the batch temperature at 65° C. and the pH at 11.5 by addition of 1 M NaOH. The mixture was then stirred at 65° C. for 2 hours. The slurry was filtered, the filter cake was washed with deionised water until the washings were pH 7 and the solid was dried in a vacuum oven at 30° C. overnight to yield a white powder.

2.4 $MgAlCO_3$LDH-85° C. Struvite Decomposition; 85° C. Ageing

To a 500 mL 3-necked flask was charged struvite powder (Alfa Aesar/NuReSys, 9.20 g) and 1 M NaOH (33 mL). The mixture was stirred (1000 rpm) at 85° C. for 1 hour under a flow of nitrogen. The ammonia off-gases were collected via a trap containing 1M HCl. $Na_2CO_3$ (5.30 g) was added to the mixture and it was stirred for a further 5 mins. A solution of $Al(NO_3)_3.9H_2O$ (4.69 g) in deionised water (33 mL) was then added dropwise at a rate of 2 mL/min, keeping the batch temperature at 85° C. and the pH at 11.5 by addition of 1 M NaOH. The mixture was then stirred at 85° C. for 2 hours. The slurry was filtered, the filter cake was washed with deionised water until the washings were pH 7 and the solid was dried in a vacuum oven at 30° C. overnight to yield a white powder.

2.5 $MgAlPO_4$LDH-85° C. Struvite Decomposition; 85° C. Ageing

Struvite ($MgNH_4PO_4.6H_2O$, 37.5 mmol for an Mg/Al ratio of 3) was dispersed in 33 mL degassed 1 M NaOH in a three-neck round bottom flask. The flask was sealed with a single outlet connected to a trap containing 1 M HCl. The mixture was stirred (1000 rpm) at 85° C. for 1 hour under a flow of $N_2$. The ammonia off-gases were collected via the trap containing 1 M HCl. A solution of aluminium nitrate nonahydrate ($Al(NO_3)_3.9H_2O$, 12.5 mmol) in 33 mL degassed deionised $H_2O$ was added to the basic struvite mixture (2 mL $min^{-1}$), keeping the system under $N_2$, the temperature at 85° C. and maintaining pH 11.5 by addition of degassed 1 M NaOH. Once addition was complete, the mixture was stirred at 85° C. for 2 hours. After the ageing period, the slurry was filtered and washed with degassed deionised $H_2O$ until the supernatant was pH 7. The solid was then dried in a vacuum oven at 30° C. overnight.

2.6 $Mg_3Al—CO_3$-AMO-SLDH-85° C. Struvite Decomposition; 85° C. Ageing

Struvite ($MgNH_4PO_4.6H_2O$, 37.5 mmol) was dispersed in 33 mL 1 M NaOH in a three-neck round bottom flask. The mixture was stirred (1000 rpm) at 85° C. for 1 hour under a flow of $N_2$. The ammonia off-gases were collected via a trap containing 1 M HCl. Sodium carbonate ($Na_2CO_3$, 50.0 mmol) was added to the mixture and stirred for a further 5 minutes. A solution of aluminium nitrate nonahydrate ($Al(NO_3)_3.9H_2O$, 12.5 mmol) in 33 mL deionised $H_2O$ was added to the basic struvite mixture dropwise (2 mL $min^{-1}$), keeping the temperature at 85° C. and maintaining pH 11.5 by addition of 1 M NaOH. Once addition was complete, the mixture was stirred at 85° C. for 2 hours. After the ageing period, the slurry was filtered and washed with deionised $H_2O$ until the supernatant was pH 7. The wet cake was rinsed with 400 mL ethanol (EtOH) and redispersed in 400 mL EtOH for 4 hours at room temperature. The product was collected by vacuum filtration and dried in a vacuum oven at 30° C. overnight.

Example 3—Preparation of LDHs by Conventional Methods

3.1 $MgAlCO_3$LDH

A metal precursor solution (50 mL) of 0.75 M $Mg(NO_3)_2.6H_2O$ and 0.25 M $Al(NO_3)_3.9H_2O$ was added dropwise into 0.5 M $Na_2CO_3$ base solution (50 mL). The pH value was kept at ca. 10.0 by dropwise addition of 4.0 M NaOH solution. After ageing for 16 h with stirring at room temperature, the mixture was filtered and washed with deionised water until the washings were approximately pH 7. Finally, the product was dried in a vacuum oven at room temperature overnight.

3.2 $MgAlPO_4$LDH

A metal precursor solution (50 mL) of 0.75 M $Mg(NO_3)_2.6H_2O$ and 0.25 M $Al(NO_3)_3.9H_2O$ was added dropwise into 0.5 M $Na_3PO_4$ base solution (50 mL) under an atmosphere of nitrogen. The pH value was kept at ca. 10.0 by dropwise addition of 4.0 M NaOH solution. After ageing for 16 h with stirring at room temperature, the mixture was filtered and washed with degassed water until the washings were approximately pH 7. Finally, the product was dried in a vacuum oven at room temperature overnight.

3.3 $MgAlCO_3$ AMO LDH

A metal precursor solution (50 mL) of 0.75 M $Mg(NO_3)_2.6H_2O$ and 0.25 M $Al(NO_3)_3.9H_2O$ was added dropwise into 0.5 M $Na_2CO_3$ base solution (50 mL). The pH value was kept at ca. 10.0 by dropwise addition of 4.0 M NaOH solution. After ageing for 16 h with stirring at room temperature, the mixture was filtered and washed with deionised water until the washings were approximately pH 7. The wet cake was re-dispersed in 100 mL of deionised water. The wet cake was rinsed with 500 mL of acetone then re-dispersed and stirred in 300 mL of this solvent at room temperature for 4 h. The solvent was removed by filtration and the obtained LDH was further rinsed by 200 mL of this solvent. Finally, the product was dried in a vacuum oven at room temperature overnight.

Characterisation of Layered Double Hydroxides

Transmission Electron Microscopy (TEM)

Figure 1:
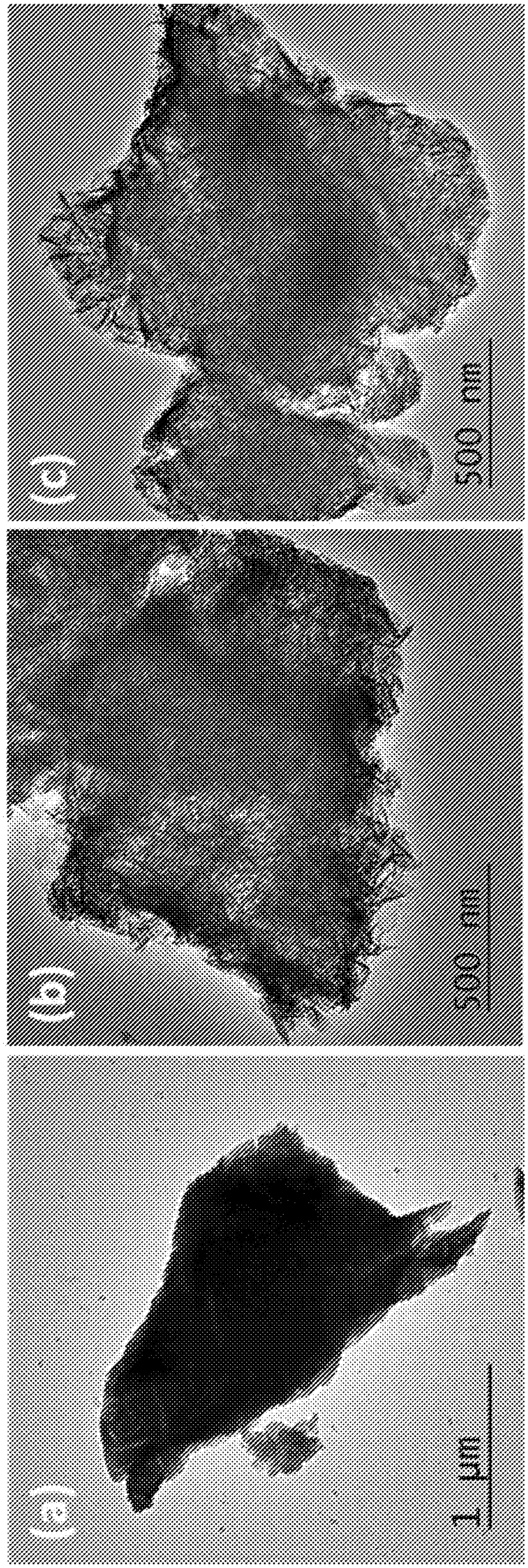
FIG. 1 shows TEM images of (a) struvite; (b) the LDH of Example 1.1; and (c) the LDH of Example 1.2.

TEM images of struvite obtained from a WWTP revealed a stone-like morphology with particles randomly sized in the 10-200 μm range (FIG. 1(*a*)). Example 1.1 and 1.2 were fluffy powders, with LDH nanosheets observed by TEM (FIGS. 1 (*b*) & (*c*)).

Figure 2:
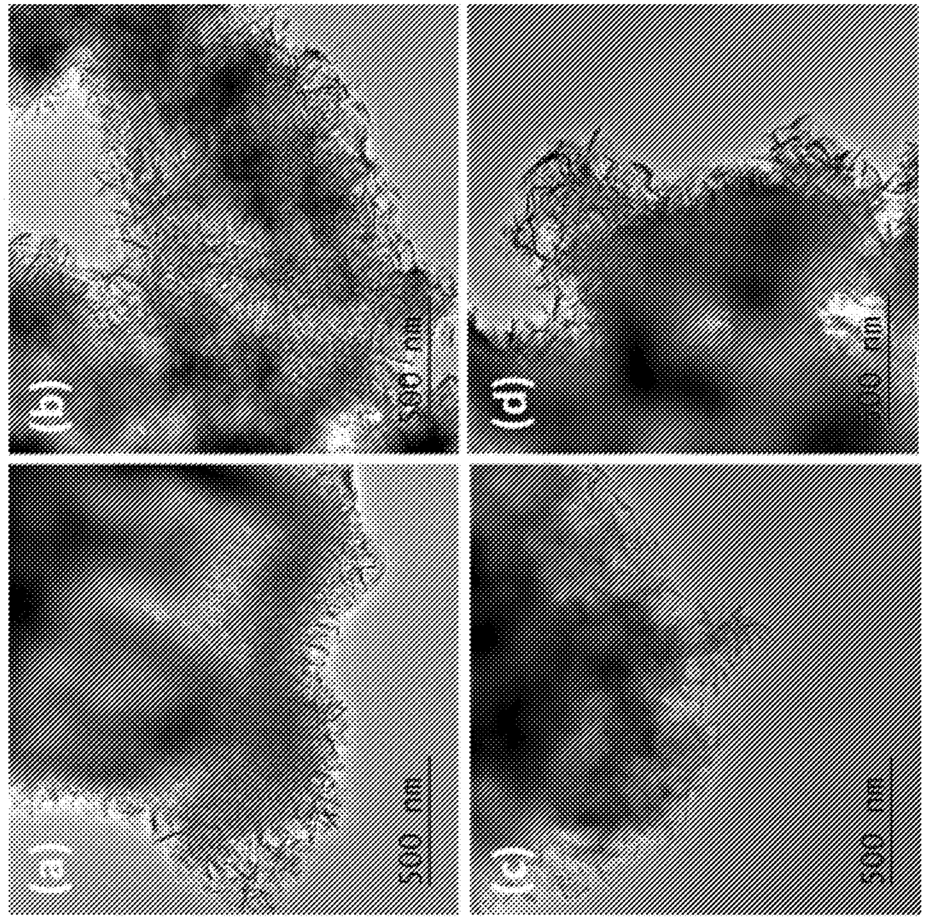
FIG. 2 shows TEM images of (a) & (b) the LDH of Example 2.1; and (c) & (d) the LDH of Example 2.2.

Examples 2.1 and 2.2 existed as nanosheets (FIG. 2), with more uniform and smaller particles than the analogous Example 1 LDHs.

Figure 3:
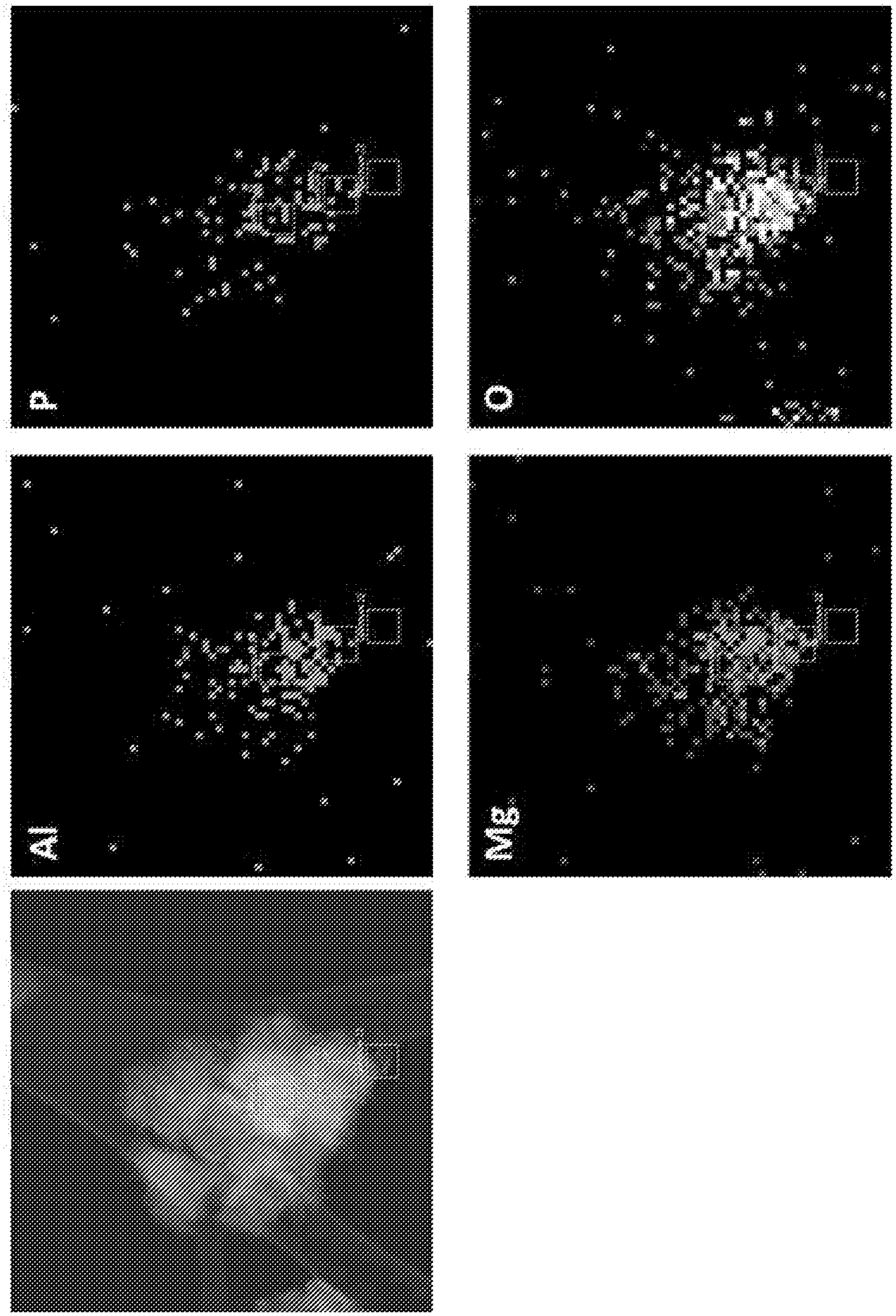
FIG. 3 shows for the LDH of Example 1.1: (top left) a dark field TEM image; (top middle) EDS Al mapping; (top right) EDS P mapping; (bottom right) EDS O mapping; and (bottom middle) EDS Mg mapping.

Example 1.1 ($MgAlCO_3$ LDH) was analysed by dark-field TEM (FIG. 3) in conjunction with EDS elemental mapping for Mg, Al, P and O, which indicated that both $CO_3$ and $PO_4$ interlayered ions were present in the sample. Furthermore, the ratio of Mg/Al in Example 1.1 was calculated at 2.6 from the EDS spectra. This compares with a Mg/Al ratio of 2.74 for Example 1.1 obtained from ICP-MS analysis. For Example 1.2, the Mg/Al ratio was found to 2.6 by EDS analysis and 2.78 by ICP-MS analysis.

Scanning Electron Microscopy (SEM)

Figure 4:
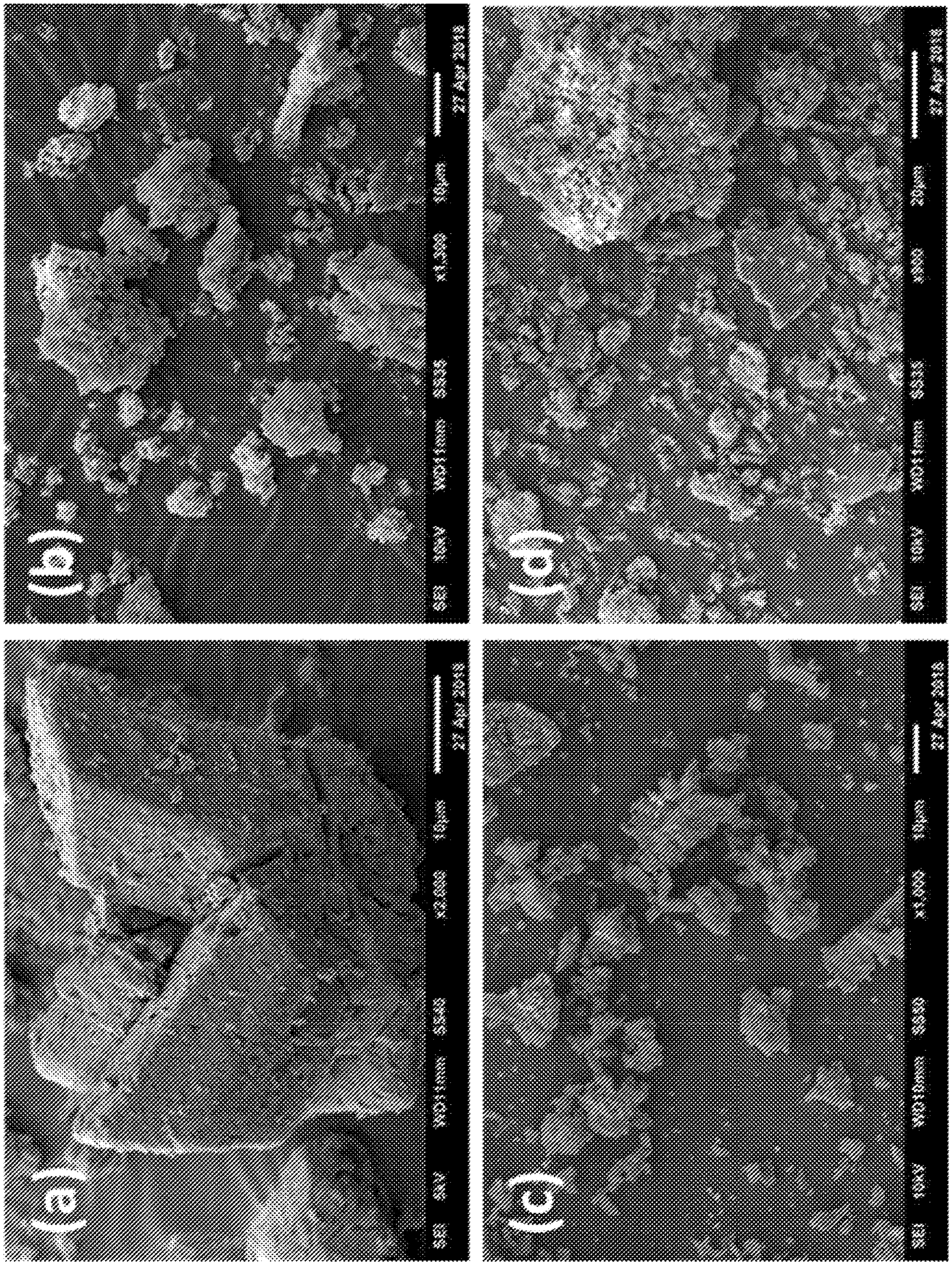
FIG. 4 shows SEM images of (a) struvite at 2,000 times magnification; (b) the LDH of Example 3.1 at 1,300 times magnification; (c) the LDH of Example 1.1 at 1,000 times magnification; and (d) the LDH of Example 1.2 at 900 times magnification.

The surface morphology of samples was analysed by SEM (FIG. 4). The morphology of struvite crystals has been reported to vary depending on the growth parameters (e.g., temperature, ion concentrations/proportions, pH, residence time). For example, struvite crystals have been described having prismatic type, pyramidal type, star type, or rectangular platelet type morphologies. The struvite sample obtained from WWTP showed a prism crystal structure with smooth surface (FIG. 4(*a*)). The LDH samples prepared from struvite (FIGS. 4(*c*) & (*d*)) showed a collapsed and coarse morphology (typically 1-2 μm sized pieces), comparable to that of conventionally-prepared LDH (FIG. 4(*b*)).

Figure 5:
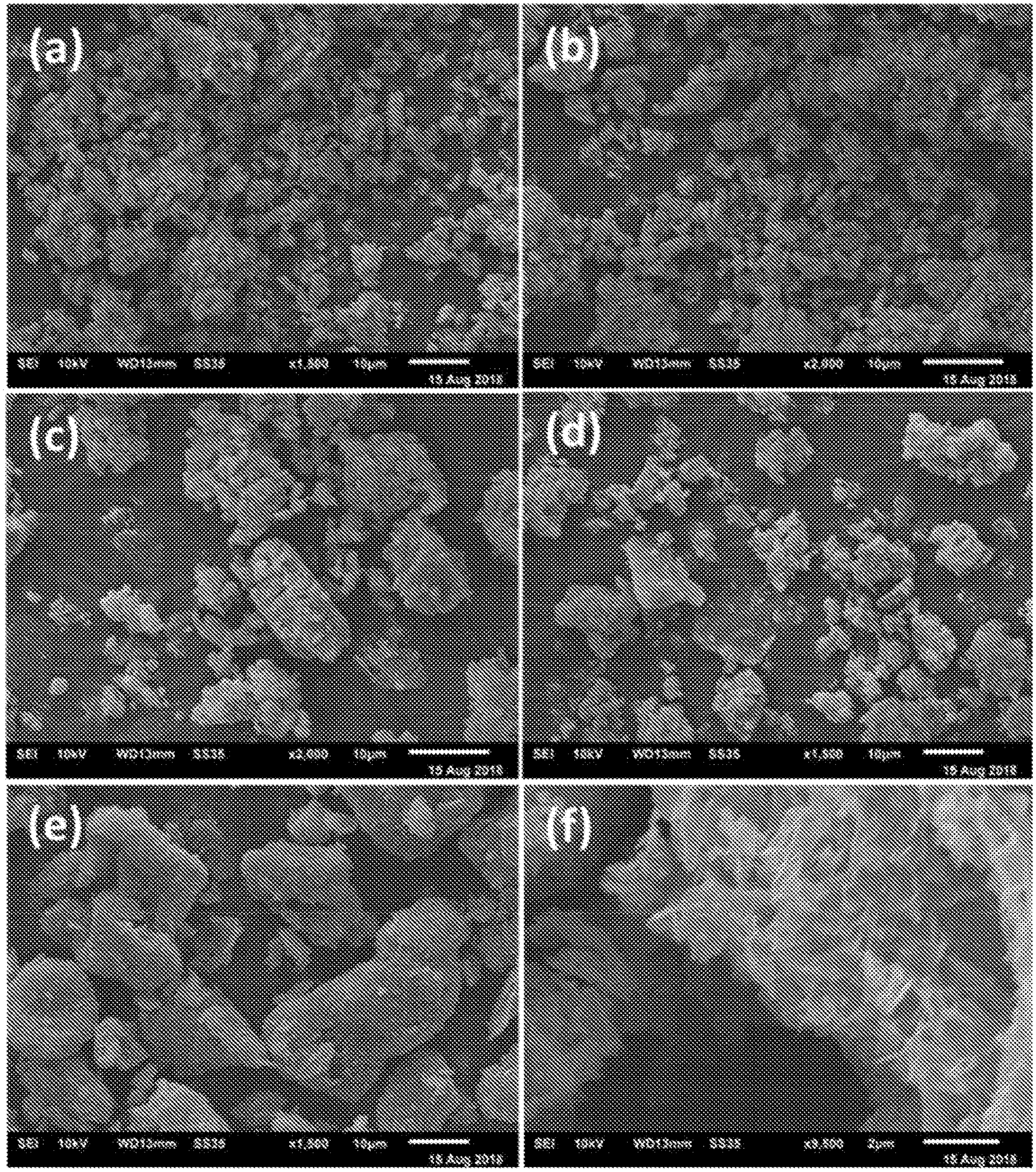
FIG. 5 shows SEM images of (a) the LDH of Example 2.1 at 1,500 times magnification; (b) the LDH of Example 2.1 at 2,000 times magnification; (c) the LDH of Example 2.2 at 2,000 times magnification; (d) the LDH of Example 2.2 at 1,500 times magnification; (e) struvite aged at 85° C. for 2 hours—at 1,500 times magnification; and (f) struvite aged at 85° C. for 2 hours—at 9,500 times magnification.

SEM analysis of struvite after 2 hr decomposition with 1M NaOH at 85° C. (sample removed from Example 2.2 prior to LDH formation) reveals an amorphous layered morphology (FIGS. 5 (*e*) & (*f*)) suggesting that this treatment fully decomposes the struvite starting material.

X-ray Powder Diffraction (XRPD)

Figure 6:
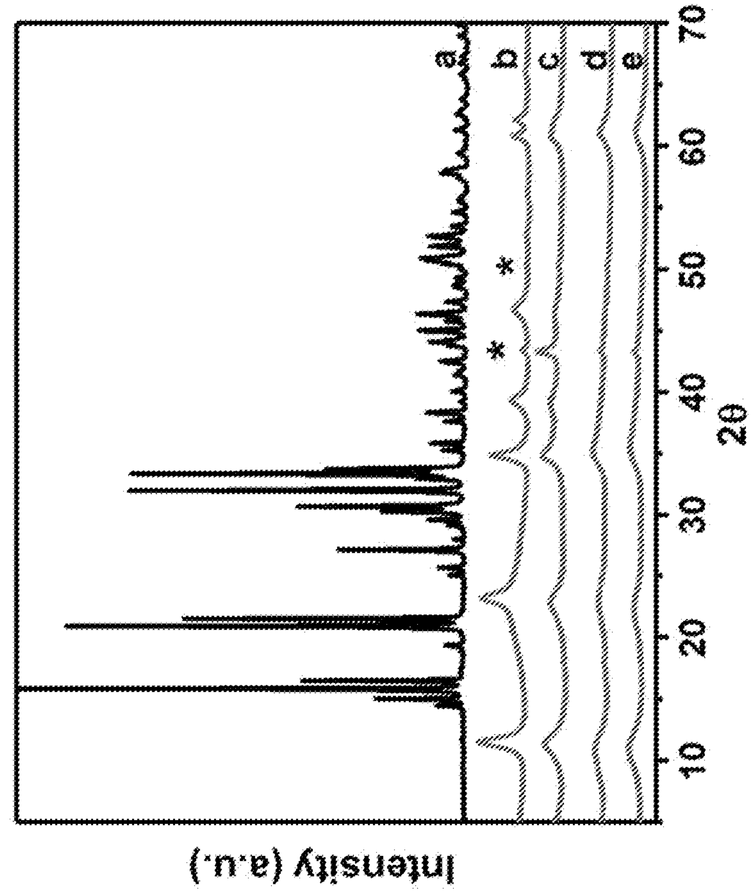
FIG. 6 shows XRPD patterns of (a) struvite; (b) the LDH of Example 3.1; (c) the LDH of Example 3.2; (d) the LDH of Example 1.2; and (e) the LDH of Example 1.1.

XRPD demonstrated (FIG. 6) that the distinctive peaks seen with the crystalline struvite sample (a) have disappeared once the Example 1 LDH materials had been synthesised (d and e).

FIG. 7 demonstrates that the Example 1.1 and 1.2 samples required approximately 5 days ageing of the reaction mixture at 35° C. to ensure complete conversion of struvite to LDH. Samples a and c show that after 3 days some struvite peaks are still visible by XRPD, compared with the respective samples (b and d) which have been aged for the full 5 days.

FIGS. 8 and 9 show that for Example 1.3 and 1.4 samples, when the struvite dissolution and ageing steps are both carried out at higher temperatures (55° C. or 75° C.), the conversion of struvite to LDH is essentially complete after 2 hr. Samples prepared at 75° C. (Example 1.4) show small impurity peaks after 4-8 hr ageing (FIG. 9), believed to be due to $Mg_3(PO_4)_2.8H_2O$ (bobierrite) and/or $Mg_2P_2O_7$.

$N_2$ Adsorption/Desorption Isotherms

The formation of Example 1.1 as a mesoporous LDH is suggested by the $N_2$ adsorption/desorption isotherm shown in FIG. 10. The isotherm is a type IV isotherm with a $H_3$ type hysteresis loop, indicating it is composed of plate-like particles with mesoporous structure.

A comparison of the pore size distribution of conventional $MgAlCO_3$ LDH (Example 3.1) and an Example 1.1 $MgAlCO_3$ LDH sample, shows that the Example 1.1 sample has increased mesoporosity of around 6-20 nm pore size (FIG. 11).

A further comparison of the pore size distributions of conventionally-prepared $MgAlCO_3$ and $MgAlPO_4$ LDHs (FIGS. 12 (*b*) & (*d*) respectively) with analogous Example 1.1 and 1.2 LDH samples (FIGS. 12 (*a*) & (*c*) respectively) and Example 2.1 and Example 2.2 samples (FIGS. 12 (*e*) & (*g*) respectively), showed that the LDHs prepared from struvite had increased mesoporosity of around 6-20 nm pore size, particularly the Example 2 samples. Example 2.2 demonstrated high levels of mesopores (2-50 nm) (FIG. 12 (*g*)).

The BET specific surface areas of Example 1 and Example 2 LDH samples were determined from $N_2$ adsorption measurements. The surface areas ranged from 59 to 315 $m^2/g$ (FIG. 13 (*c*) to (*f*)). It was found that the samples had increased surface areas compared to the corresponding LDHs prepared by conventional means (FIGS. 13 (*a*) & (*b*)). The specific surface areas were particularly high (>200 $m^2/g$) for the Example 2 LDH samples, with Example 2.2 giving an even higher surface area (FIG. 13 (*f*)), than the Example 2.1 (FIG. 13 (*e*)).

Infrared Spectroscopy (FTIR)

FTIR spectroscopy was used to detect functional groups existing in the struvite and LDH samples. The carbonate (1380 $cm^{-1}$) and OH (3470 and 1645 $cm^{-1}$) stretching bands are visible in FIG. 14 (*e*), thus confirming that an $MgAlCO_3$ LDH has been formed; while the OH (3470 and 1645 $cm^{-1}$) and phosphate (1054 $cm^{-1}$) stretching bands are visible in FIG. 14 (*b*), thus confirming that an $MgAlPO_4$ LDH has been formed. The peak at 2800 $cm^{-1}$ in the struvite sample (FIG. 14 (g)) is attributed to the stretching vibrations of isolated $NH_{4+}$ ions. In the LDH samples aged for 5 days (Example 1.2 (b) and Example 1.1 (e)), no stretching vibrations of isolated $NH_{4+}$ were detected. The Example 1.1 and 1.2 LDH samples after 3 days ageing (c and f), however, still show bands corresponding to unreacted struvite (as indicated by arrows).

Density and BET Surface Area

Tap density was measured following the standard testing method ASTM D7481-09. The specific surface area of the samples was determined by the Brunauer-Emmett-Teller (BET) method using the $N_2$ adsorption and desorption isotherms collected at 77 K on a Micromeritics TriStar II 3030 instrument. The samples were degassed at 110° C. overnight before analysis. FIG. 15 shows that LDHs synthesised from struvite (Alfa Aesar 98% ammonium magnesium phosphate and NuReSys BioStru fertiliser granules) according to Example 2.4 have surprisingly high surface areas and densities compared to conventionally-prepared LDHs.

PART B

Characterisation of Layered Double Hydroxides

Effect of Changing Anion

Phosphate is a known interlayer species in LDHs. It is typically more difficult to prepare because of competition from carbonate (from the atmosphere and dissolved in water), which has a stronger affinity for the interlayer gallery. Nevertheless, measures can be taken to minimise the reaction mixture's exposure to carbonate (e.g. degassed water and a nitrogen atmosphere). Example 2.5 allowed for the successful preparation of phosphate-intercalated SLDHs ($PO_4$-SLDHs).

The XRD spectra show that $PO_4$-SLDHs of Example 2.5 have lower crystallinity than the corresponding carbonate SLDHs prepared by Example 2.4 ($CO_3$-SLDHs, FIG. 16 and Table 1). The higher charge and different geometry of the $PO_4^{3-}$ anion contributes to the stacking disorder of the hydroxide sheets. Additionally, crystallinity decreases with increasing $Al^{3+}$ content. This is due to the higher proportion of trivalent cations in the hydroxide layers causing greater distortion from the brucite structure, leading to poorer arrangement for stacking.

The dotted lines in FIG. 16 highlight the difference in basal spacing between the carbonate and phosphate SLDHs. As the $PO_4^{3-}$ anion is larger than $CO_3^{2-}$ the 003 Bragg reflections for the $PO_4$-SLDHs appear at lower 2θ values, which correspond to larger interlayer distances (Table 1). For the $PO_4$-SLDHs, the d-spacing values also suggest that some carbonate impurities may be present despite measures to isolate the system during the synthesis. This is corroborated by the presence of an absorption peak at ca. 1360 $cm^{-1}$ in the FTIR spectra (FIG. 17*a*).

TABLE 1 d-spacing of SLDHs of Examples 2.4 and 2.5 calculated from powder XRD spectra

| Mg/Al ratio[a] | Interlayer species | 003[b] (°) | $d_{003}$ (nm) | FWHM (°) |
|---|---|---|---|---|
| 2 | $CO_3^{2-}$ | 11.36864 | 0.778 | 1.743 |
| 2 | $PO_4^{3-}$ | 11.05112 | 0.800 | 2.294 |
| 3 | $CO_3^{2-}$ | 11.35193 | 0.779 | 1.121 |
| 3 | $PO_4^{3-}$ | 11.15139 | 0.793 | 1.822 |

[a]Confirmed by ICP-MS
[b]Position of 003 Bragg reflection (2θ). λ = 0.1541847 nm.

The TGA and dTGA data provide further evidence of this (FIG. 17*b*). The second mass loss for both $PO_4$-SLDHs occurs at higher temperatures than that of the $CO_3$-SLDHs, but the peak for $Mg_3Al$—$PO_4$ is at a lower temperature than $Mg_2Al$—$PO_4$. This suggests that carbonate forms attractive interactions with phosphate, making it more difficult to release from the interlayer region. The TGA analyses also show that the $PO_4$-SLDHs contain more water than $CO_3$-SLDHs, which is due to the higher hydrophilicity of the phosphate anion.

All four SLDHs discussed in Table 1 are mesoporous and the H3 hysteresis shapes indicate slit-like pores (FIG. 18*a*). Both $PO_4$-SLDHs discussed in Table 1 have high densities but low surface areas (9 and 37 $m^2$ $g^{-1}$ for Mg/Al=2 and 3, respectively, FIG. 19). The $PO_4$-SLDHs have fewer pores in the size range 100-400 Å. From the SEM images (FIGS. 20 and 21) it can be seen that the $CO_3$-SLDHs are more fragmented and contain more particles having the sand-rose morphology. This suggests that the addition of carbonate enhances the dissolution of struvite, possibly through the homogeneous pH rise that occurs when $Na_2CO_3$ dissolves in the slurry.

Effect of Changing Struvite Starting Material

Two WWTP struvites were chosen to be studied and compared against the synthetic struvite from Alfa Aesar. The sample from NuReSys was chosen because it has an XRD pattern most similar to that of the pure struvite. Aa en Maas was chosen because it has the highest BET surface area, which may have a positive effect on the surface area of the product.

SLDH was prepared from NuReSys struvite using the Example 2.4 procedure. It was found upon scaling up that a higher temperature was required to ensure complete conversion of the starting material to SLDH (FIG. 22). SLDHs can be reliably produced on a 9 g scale using Example 2.4 at 85° C. with an ageing time of 2 h (FIG. 23).

The XRD patterns for the three SLDHs made from NuReSys, Alfa Aesar and Aa en Maas struvite according to Example 2.4 all exhibit sharp Bragg reflections, indicating a high degree of crystallinity (FIG. 23). The FWHM of both the basal and non-basal peaks are greatest for NuReSys SLDH which suggests that it has the smallest crystallite size of the three (Tables 2 and 3). The d-spacing, $d_{003}$, is ca. 0.779 nm, which suggests the interlayer galleries contain a mixture of carbonate and residual phosphate. Elemental analysis by ICP-MS confirms the presence of phosphorus in all samples (Table 4).

TABLE 2

Basal spacing and c lattice parameter of Example 2.4 SLDHs prepared from a variety of struvite starting materials

| Struvite | 003[a] (°) | $d_{003}$ (nm) | c[b] (nm) | FWHM (°) |
|---|---|---|---|---|
| Alfa Aesar | 11.35193 | 0.779 | 2.337 | 1.047 |
| NuReSys | 11.37430 | 0.777 | 2.331 | 1.462 |
| Aa en Maas | 11.45540 | 0.772 | 2.316 | 0.903 |

[a]Position of 003 Bragg reflection (2θ). λ = 0.1541847 nm.
[b]Lattice parameter c = $3d_{003}$

TABLE 3

Non-basal spacing and a lattice parameter of Example 2.4 SLDHs prepared from a variety of struvite starting materials

| Struvite | 110[a] (°) | $d_{110}$ (nm) | a[b] (nm) | FWHM (°) |
|---|---|---|---|---|
| Alfa Aesar | 60.60890 | 15.26 | 30.52 | 0.973 |
| NuReSys | 60.72100 | 15.24 | 30.48 | 1.084 |
| Aa en Maas | 60.62730 | 15.26 | 30.52 | 0.692 |

[a]Position of 003 Bragg reflection (2θ). λ = 0.1541847 nm.
[b]Lattice parameter a = $2d_{110}$

TABLE 4

Summary of the ICP-MS elemental analyses for Mg, Al, and P content of Example 2.4 SLDHs prepared from a variety of struvite starting materials

| | Struvite | | |
|---|---|---|---|
| Av. wt. % | Alfa Aesar | NuReSys | Aa en Maas |
| $^{24}$Mg | 21.77 | 20.28 | 20.83 |
| $^{27}$Al | 8.19 | 7.71 | 7.67 |
| $^{31}$P | 1.40 | 2.46 | 1.03 |
| Av. Mg/Al | 2.84 | 2.81 | 2.90 |

The peak widths of the Bragg reflections in the XRD spectra also indicate that the NuReSys SLDH has the lowest crystallinity and/or smallest crystallite sizes, and this can be observed in the SEM images (FIG. 24). In all samples, sand rose-like clusters are observed. For the Alfa Aesar and Aa en Maas SLDHs, which came from coffin-shaped struvite crystals (ca.

50 and 300 nm, respectively), large straight-edged crystals are also present (FIGS. 24*a* and *c*). The absence of these large structures in the NuReSys SLDH suggests that the NuReSys struvite is less resistant to high pH and high temperatures. The primary particles of NuReSys struvite were more than one order of magnitude larger than those of Alfa Aesar and Aa en Maas, but the interior of the pellets consists of small prismatic crystals compressed together. Once the binding agents are overcome by the alkalinity and heat, these small crystals would be more susceptible to decomposition. Thus, the NuReSys SLDH consists of much smaller clusters (FIG. 24*b*).

As the LDH particles prepared by co-precipitation are generally less than 500 nm in diameter, transmission electron microscopy (TEM) was also used to investigate the morphology of the various SLDHs (FIG. 25). The TEM images reveal significant differences in the morphology of the SLDHs. The Alfa Aesar SLDH is flower-like (e.g. clustered) whilst both the NuReSys SLDH and Aa en Maas SLDH comprise of much smaller platelets that are not interwoven. For the NuReSys SLDH, the small crystallite size was to be expected from the broad reflections in the XRD spectrum (FIG. 23). In the Aa en Maas SLDH, the platelets are approximately hexagonal, which is a known morphology for LDHs. The particles are less well-defined in NuReSys SLDH. This difference in morphology is reflected in their tap densities (FIG. 26).

Compared to the equivalent commercial LDH (Pural MG70 HT) and conventional LDH of Example 3.1, the Alfa Aesar and NuReSys SLDHs have very high surface areas (184 and 174 $m^2 g^{-1}$, respectively) that are even in the range of AMO-LDHs of Example 3.3 (FIG. 26). The reference conventional LDH synthesised under the same conditions has less than half the surface area of the Alfa Aesar SLDH (85 $m^2 g^{-1}$). The high surface area struvite from Aa en Maas produces an SLDH with the lowest surface area (136 $m^2 g^{-1}$) but this is still three times that of the conventional LDH. This SLDH also has the highest tap density (0.68 g $cm^{-3}$), which is consistent with the observations that it is the most crystalline (FIG. 23). This supports the theory that the Aa en Maas struvite disperses most efficiently, as it has the highest surface area and lowest tap density, which enhances interactions between the ions in the slurry and thereby allowing a more crystalline SLDH to form.

All three of the SLDHs made from NuReSys, Alfa Aesar and Aa en Maas struvite according to Example 2.4 are mesoporous and have multi pore distributions (FIG. 27). The biggest difference between the pore size distributions is the high number of small pores (ca. 50 Å) in the NuReSys SLDH. This is consistent with the small particle size observed under SEM and TEM analyses.

The three SLDHs are two to four times denser than the equivalent AMO-LDH of Example 3.3 and three to six times the surface area of the equivalent conventional LDH of Example 3.1. Struvite is a therefore a promising precursor to high density, high surface area LDHs without the need for surface modification.

Post Modification of S-LDHs

The aqueous miscible organic solvent treatment (AMOST) method is known to produce high surface area LDHs. However, struvite has been shown to be an effective and inexpensive precursor for high surface area SLDHs without the need for costly solvent treatment. These SLDHs also have high tap densities and unique morphologies as a result of the synthesis method. It was therefore of interest to investigate if the AMOST method could be applied to SLDHs to enhance the surface area further.

$Mg_3Al$—$CO_3$-AMO-SLDHs (AMO-SLDHs) were prepared using the Example 2.6 procedure, which includes the step of dispersing the SLDH wet cake in ethanol (EtOH) prior to drying using the conditions previously developed by Chen et al. (C. Chen, M. Yang, Q. Wang, J.-C. Buffet and D. O'Hare, *J. Mater. Chem.* A, 2014, 2, 15102-15110.). As expected, the Bragg reflections in the XRD diffractogram of the AMO-SLDH are unchanged relative to the SLDH of Example 2.4—since AMOST is primarily a surface modification and does not alter the chemical composition of the hydroxide layers nor the content of the interlayer galleries (FIG. 28). However, there is some broadening of the Bragg reflections (Tables 5 and 6). This is most significant for the 00/peak reflections and the ratio of peak intensities of the basal and non-basal reflections, $I_{003}/I_{110}$, decreases, which indicates a reduction in the number of hydroxide layers stacked together along the c-axis. These observations are consistent with the delamination of some of the SLDH sheets under the influence of the AMO solvent.

TABLE 5

Basal spacing and c lattice parameter of Example 2.4 and 2.6 SLDHs, showing the effect of AMOST. Mg/Al = 3

| | 003[a] (°) | $d_{003}$ (nm) | c[b] (nm) | FWHM (°) |
|---|---|---|---|---|
| Example 2.4 | 11.35193 | 0.779 | 2.337 | 1.047 |
| Example 2.6 | 11.38535 | 0.777 | 2.331 | 1.290 |

[a]Position of 003 Bragg reflection (2θ). λ = 0.1541847 nm.
[b]Lattice parameter c = $3d_{003}$

TABLE 6

Diffraction peak positions and intensities of Example 2.4 and 2.6 SLDHs, showing the effect of AMOST. Mg/Al = 3

| | 003[a] (°) | $I_{003}$[b] (a.u.) | 110[a] (°) | $I_{110}$[b] (a.u.) | $I_{003}/I_{110}$ |
|---|---|---|---|---|---|
| Example 2.4 | 11.31850 | 8469 | 60.53319 | 4290 | 1.974 |
| Example 2.6 | 11.38535 | 5526 | 60.56661 | 3705 | 1.491 |

[a]Position of Bragg reflection (2θ)
[b]Intensity of Bragg reflection

TABLE 7

$N_2$ BET specific surface area and BJH pore volume of Example 2.4 and 2.6 SLDHs, showing the effect of AMOST. Mg/Al = 3

| | BET specific surface area ($m^2\ g^{-1}$) | Pore volume[a] ($cm^3\ g^{-1}$) |
|---|---|---|
| Example 2.4 | 184 | 0.67 |
| Example 2.6 | 233 | 1.39 |

[a]BJH method

Similarly, whilst the BET specific surface area of the AMO-SLDH is very high (233 $m^2\ g^{-1}$, Table 7 and FIG. 29), the percentage increase is smaller than between the equivalent conventional LDHs and AMO-LDHs. For example, Yang et al. (M. S. Yang, O. McDermott, J.-C. Buffet and D. O'Hare, *RSC Adv.,* 2014, 4, 51676-51682) recorded the BET specific surface area of an AMO-LDH (EtOH) to be 240 $m^2\ g^{-1}$, which is more than twice that of a conventional water-washed LDH prepared under the same conditions (110 $m^2\ g^{-1}$). For the SLDHs, AMOST treatment increases the surface area by ca. 50 $m^2\ g^{-1}$, which is only a 27% increase from the surface area of the untreated SLDH.

The pore volume of the AMO-SLDH is double the pore volume of the untreated SLDH (Table 7). The BJH pore size distributions show that the increases in surface area and pore volume are due to the increase in the number of larger pores and reduction in the population of pores below 100 Å (FIG. 30*b*). The pore sizes remain in the mesoporous range.

The increase in surface area is, however, accompanied by a notable decrease in density. Indeed, the AMO-SLDH of Example 2.6 is three-times less dense than the SLDH of Example 2.4 (FIG. 29). Solvation of the layers results in swelling of the structures and the smaller AMO-SLDH particles have a loose flower-like morphology. The tap density of AMO-SLDHs is ca. 0.9 g $cm^{-3}$ lower than the tap density of the SLDH. This supports the hypothesis that the AMO solvent is unable to penetrate the larger SLDH crystals (which are in the minority).

The investigation has shown that the AMOST technique is less effective at increasing the surface area of SLDHs because of their unique morphology. SLDHs are themselves high surface area materials without the need for surface treatment.

Layered Double Oxide (LDO) Synthesis and $CO_2$ Capture

Alfa Aesar and NuReSys SLDHs prepared according to Example 2.4 were calcined in a muffle oven at four different temperatures. The heating rate was fixed at 5° C. $min^{-1}$ for all samples.

The powder X-ray diffraction (XRD) spectra show progressive decomposition of the SLDHs as temperature is increased, which is characteristic of LDHs (FIG. 31). NuReSys SLDH has a lower degree of crystallinity than the Alfa Aesar SLDH so it decomposes more readily, which is illustrated by the differences in peak shapes between ca. 33-45°.

At 200° C., dehydration occurs both on the surface and in the interlayer gallery. An upwards shift of the 003 peak, relative to its position in the spectrum of the fresh SLDH, indicates a decrease in the basal spacing and the diminished intensities of the 006, 009 and 01/ peaks indicate partial collapse of the layered structure. A consequence of this is a decrease of this is a decrease in surface area The layered structure is no longer apparent at 400° C. The broad peaks at 43 and 62° can be indexed to the 200 and 202 Miller planes of periclase MgO (JCPDS card no. 43-1022). The d-spacing of this phase is 4.17 Å, which is smaller than that reported for pure MgO (4.21 Å). This difference is attributed to the presence of $Al^{3+}$ cations in the lattice, which have a smaller ionic radius. The broad peak at 35° may be indexed to an $AlO_3$-like phase (104 plane). The low aluminium content of the SLDH means that this phase is likely to contain defects. The 111 plane of MgO may also overlap with this reflection as it occurs at 36.9°.

The broadness of these peaks suggests that the oxides are amorphous and/or consist of small particles. They sharpen with increasing temperature which indicates increased ordering. The reflections characteristic of MgO also shift to lower angles (i.e. higher d-spacings) as the temperature increases from 400° C. to 800° C., which may indicate the migration of $Al^{3+}$ cations from the MgO lattice to the surface. Studies by Gao et al. (Y. Gao, Z. Zhang, J. Wu, X. Yi, A. Zheng, et al., *J. Mater. Chem.* A, 2013, 1, 12782-12790.) using $^{27}Al$ ssNMR show that in fresh LDHs, all $Al^{3+}$ cations are octahedrally coordinated in the brucite-like layers and are gradually transformed into tetrahedrally coordinated $Al^{3+}$, by diffusion to the surface, as calcination temperature increases. These structural changes results in $Al^{3+}$ vacancies in the layers.

The $CO_2$ adsorption capacity of struvite and SLDOs has been evaluated using TGA. Firstly, it can be seen that struvite does not possess any sorption ability (FIG. 32). Secondly, the trend in $CO_2$ adsorption capacity of the SLDOs approximately follows that of BET specific surface area (FIG. 33).

LDOs were also prepared from a commercial LDH (Pural MG70 HT) and the conventional LDH of Example 3.1. FIG. 34 shows that for LDOs prepared at 400° C., the SLDOs are superior sorbents compared to both the commercial LDO and conventional LDO, with the Alfa Aesar SLDO having the highest $CO_2$ adsorption of ca. 1.5 mmol $g^{-1}$.

While specific embodiments of the invention have been described herein for the purpose of reference and illustration, various modifications will be apparent to a person skilled in the art without departing from the scope of the invention as defined by the appended claims.

The invention claimed is:

1. A process for the preparation of a magnesium-containing layered double hydroxide, the process comprising the step of:

a) using a magnesium phosphate-containing mineral as a source of $Mg^{2+}$ ions in a process of preparing a layered double hydroxide.

2. The process of claim 1, wherein the magnesium phosphate-containing mineral is struvite or a magnesium phosphate-containing mineral derived from struvite.

3. The process of claim 1, wherein $Mg^{2+}$ ions are generated in step a) by contacting the magnesium phosphate-containing mineral with an aqueous solution.

4. The process of claim 3, wherein the temperature of the aqueous solution is 5-120° C.

5. The process of claim 1, wherein the magnesium phosphate-containing mineral is struvite or a magnesium phosphate-containing mineral derived from struvite, and the $Mg^{2+}$ ions are generated in step a) by contacting the magnesium phosphate-containing mineral with an aqueous solution for 30-75 minutes at a temperature of 55-90° C., and wherein the process of step a) is a coprecipitation process.

6. The process of claim 1, wherein step a) comprises mixing the $Mg^{2+}$ ions with:

M', wherein M' is one or more trivalent or tetravalent cations,

X, wherein X is one or more anions, and optionally M, wherein M is a monovalent or divalent cation other than $Mg^{2+}$, in an aqueous reaction medium at a pH sufficient to form a layered double hydroxide.

7. The process of claim 6, wherein the pH of the aqueous reaction medium is 9.5-13.0.

8. The process of claim 6, wherein the temperature of the aqueous reaction medium is 65-85° C. and the formed layered double hydroxide is aged in the aqueous reaction medium for 1-24 hours.

9. The process of claim 6, wherein M' is selected from $Al^{3+}$, $Ga^{3+}$, $Y^{3+}$, $In^{3+}$, $Fe^{3+}$, $Co^{3+}$, $Ni^{3+}$, $Mn^{3+}$, $Cr^{3+}$, $Ti^{3+}$, $V^{3+}$, $La^{3+}$, $Sn^{4+}$, $Ti^{4+}$ and $Zr^{4+}$; M is selected from $Li^{+}$, $Ca^{2+}$, $Zn^{2+}$, $Fe^{2+}$, $Ni^{2+}$, $Co^{2+}$, $Mn^{2+}$ and $Cu^{2+}$; and X is selected from a halide, an inorganic oxyanion, an anionic surfactant, an anionic chromophore and an anionic UV absorber.

10. The process of claim 9, wherein X is one or more of carbonate, phosphate, sulfate and nitrate.

11. The process of claim 6, wherein M' is $Al^{3+}$ and M is absent or is $Zn^{2+}$.

12. The process of claim 11, wherein X is carbonate.

13. The process of claim 6, wherein X is one or more of carbonate and phosphate.

14. The process of claim 1, wherein the layered double hydroxide is a phosphate-containing layered double hydroxide and step a) further comprises using the magnesium phosphate-containing mineral as a source of phosphate ions in the process of preparing the layered double hydroxide.

15. A magnesium-containing layered double hydroxide produced by the process of claim 1 and having a specific surface area of ≥80 $m^2$ $g^{-1}$ and a tap density of at least 0.35 g $cm^{-3}$.

16. The magnesium-containing layered double hydroxide as claimed in claim 15, wherein the layered double hydroxide has a specific surface area of ≥100 $m^2$ $g^{-1}$.

17. The magnesium-containing layered double hydroxide as claimed in claim 15, wherein the layered double hydroxide has a tap density of at least 0.45 g $cm^{-3}$.

18. The magnesium-containing layered double hydroxide as claimed in claim 15, wherein the layered double hydroxide is a MgAl layered double hydroxide or a MgZnAl layered double hydroxide, optionally wherein carbonate accounts for >75 wt % of all interlayer anions present in the layered double hydroxide.

19. The magnesium-containing layered double hydroxide as claimed in claim 15, wherein the layered double hydroxide is a magnesium aluminium carbonate layered double hydroxide.

20. A thermally-treated magnesium-containing layered double hydroxide as claimed in claim 15.

* * * * *